US012610295B2

(12) United States Patent
Yang et al.

(10) Patent No.: US 12,610,295 B2
(45) Date of Patent: Apr. 21, 2026

(54) MEASUREMENT REPORTING METHOD AND DEVICE

(71) Applicant: VIVO MOBILE COMMUNICATION CO., LTD., Dongguan (CN)

(72) Inventors: Ang Yang, Dongguan (CN); Peng Sun, Dongguan (CN); Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 448 days.

(21) Appl. No.: 18/104,961

(22) Filed: Feb. 2, 2023

(65) Prior Publication Data

US 2023/0180081 A1 Jun. 8, 2023

Related U.S. Application Data

(63) Continuation of application No. PCT/CN2021/110113, filed on Aug. 2, 2021.

(30) Foreign Application Priority Data

Aug. 6, 2020 (CN) .......................... 202010785811.2

(51) Int. Cl.
*H04W 36/00* (2009.01)
*H04W 24/10* (2009.01)
*H04W 36/30* (2009.01)
(52) U.S. Cl.
CPC ....... *H04W 36/0088* (2013.01); *H04W 24/10* (2013.01); *H04W 36/302* (2023.05)

(58) Field of Classification Search
CPC ............. H04W 36/0088; H04W 24/10; H04W 36/302; H04W 36/0085; H04W 36/0058
See application file for complete search history.

(56) References Cited

U.S. PATENT DOCUMENTS

| | | | |
|---|---|---|---|
| 8,767,581 B2 | 7/2014 | Yamada | |
| 2010/0167736 A1* | 7/2010 | Kobayashi | H04W 48/20 455/435.2 |
| 2020/0053584 A1 | 2/2020 | Zhou et al. | |
| 2020/0107337 A1 | 4/2020 | Lin | |
| 2021/0367741 A1 | 11/2021 | Yiu et al. | |

(Continued)

FOREIGN PATENT DOCUMENTS

| | | |
|---|---|---|
| CN | 101179841 A | 5/2008 |
| CN | 103237324 A | 8/2013 |
| CN | 104303544 A | 1/2015 |

(Continued)

OTHER PUBLICATIONS

Physical layer procedures for data, 3GPP TS 38.214 V15.10.0 Release 15 (Jul. 2020) (Year: 2020).*

(Continued)

*Primary Examiner* — Shawn D Miller
(74) *Attorney, Agent, or Firm* — The Webb Law Firm

(57) ABSTRACT

A measurement reporting method includes: performing, by UE, measurement on a target reference signal of a target neighboring cell of a first cell at a layer 1 to obtain a first measurement result; and reporting, by the UE, a target measurement report to a network side device through the layer 1. The target measurement report includes the first measurement result.

18 Claims, 5 Drawing Sheets

UE performs measurement on a target reference signal of a target neighboring cell of a first cell at a layer 1 to obtain a first measurement result ⟋ 201

The UE reports a target measurement report to a network side device through the layer 1 ⟋ 202

(56) References Cited

U.S. PATENT DOCUMENTS

2022/0295323  A1 *  9/2022  Wang ................... H04B 17/318

FOREIGN PATENT DOCUMENTS

| | | | |
|---|---|---|---|
| CN | 110381531 | A | 10/2019 |
| CN | 111095824 | A | 5/2020 |
| CN | 111247852 | A | 6/2020 |
| EP | 4075849 | A1 | 10/2022 |
| GB | 2507821 | A | 5/2014 |
| WO | 2020034568 | A1 | 2/2020 |
| WO | 2022021335 | A1 | 2/2022 |

OTHER PUBLICATIONS

Ericsson, "Lower-layer mobility enhancements", 3GPP TSG-RAN WG1 Meeting #98bis, Chongqing, China, Oct. 14-20, 2019, Tdoc R1-1911226.
Huawei et al., "Views on beam-based mobility in NR", 3GPP TSG RAN WG1 Meeting #97, Reno, US, May 13-17, 2019, R1-1907543.

* cited by examiner

Network side device

11

11

Terminal

Terminal

| UE performs measurement on a target reference signal of a target neighboring cell of a first cell at a layer 1 to obtain a first measurement result | 201 |

↓

| The UE reports a target measurement report to a network side device through the layer 1 | 202 |

| A network side device sends first configuration information to UE | 301 |

600

700

MEASUREMENT REPORTING METHOD AND DEVICE

CROSS-REFERENCE TO RELATED APPLICATIONS

This application is a Bypass Continuation Application of PCT/CN2021/110113 filed Aug. 2, 2021, and claims priority to Chinese Patent Application No. 202010785811.2 filed Aug. 6, 2020, the disclosures of which are hereby incorporated by reference in their entireties.

BACKGROUND OF THE INVENTION

Field of the Invention

This application pertains to the field of communications technologies, and in particular, to a measurement reporting method and apparatus, and a device.

Description of Related Art

Currently, user equipment (UE) may measure the signal quality of the reference signal (RS) of the neighboring cell, so as to determine whether to perform cell handover based on the signal quality.

In order to avoid short-term fluctuation of measurement results, it is usually necessary to average a series of evenly distributed measurement samples within a measurement period, which may be referred to as the high-layer (for example, layer 3) measurement. The layer 3 measurement is to obtain a measurement result through the layer 1 measurement first, and then layer 3 filtering is performed on the measurement result to obtain a final measurement result. Finally, the UE may report a measurement result of the layer 3 measurement to a network side device.

SUMMARY OF THE INVENTION

According to a first aspect, a measurement reporting method is provided, and the method includes: performing, by UE, measurement on a target reference signal of a target neighboring cell of a first cell at a layer 1 to obtain a first measurement result; and reporting, by the UE, a target measurement report to a network side device through the layer 1, where the target measurement report includes the first measurement result.

According to a second aspect, a measurement reporting apparatus is provided, and the measurement reporting apparatus includes a measurement module and a reporting module, where the measurement module is configured to perform measurement on a target reference signal of a target neighboring cell of a first cell at a layer 1 to obtain a first measurement result; and the reporting module is configured to report a target measurement report to a network side device through the layer 1, where the target measurement report includes the first measurement result.

According to a third aspect, a measurement reporting method is provided, and the method includes: sending, by a network side device, first configuration information to UE, where the first configuration information is used for the UE to perform a target operation at a layer 1; and the target operation includes any one of: that the UE measures or reports a neighboring cell of a first cell and the first cell at the layer 1; or that the UE measures or reports the neighboring cell of the first cell at the layer 1.

According to a fourth aspect, a measurement reporting apparatus is provided, and the measurement reporting apparatus includes a sending module; the sending module is configured to send first configuration information to user equipment (UE), where the first configuration information is used for the UE to perform a target operation at a layer 1; and the target operation includes any one of: that the UE measures or reports a neighboring cell of a first cell and the first cell at the layer 1; or that the UE measures or reports the neighboring cell of the first cell at the layer 1.

According to a fifth aspect, user equipment is provided, where the user equipment includes a processor, a memory, and a program or an instruction stored in the memory and executable on the processor, and when the program or the instruction is executed by the processor, steps of the method according to the first aspect are implemented.

According to a sixth aspect, a network side device is provided, where the network side device includes a processor, a memory, and a program or an instruction stored in the memory and executable on the processor, and when the program or the instruction is executed by the processor, steps of the method according to the first aspect are implemented.

According to a seventh aspect, a non-transitory computer-readable storage medium is provided. The non-transitory computer-readable storage medium stores a program or an instruction, and when the program or the instruction is executed by a processor, steps of the method according to the first aspect or the third aspect are implemented.

According to an eighth aspect, a chip is provided. The chip includes a processor and a communications interface, the communications interface is coupled to the processor, and the processor is configured to execute a program or an instruction of a network side device, to implement the method according to the first aspect or the method according to the third aspect.

DESCRIPTION OF THE INVENTION

Figures 1, 2, 3:
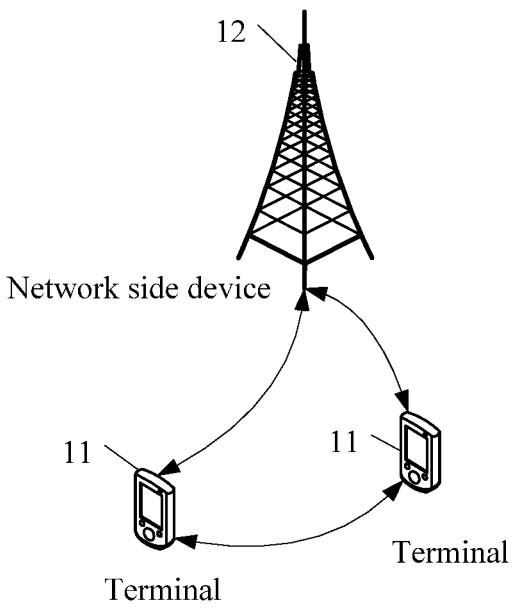
FIG. 1 is a system architecture diagram of a communications system according to an embodiment of this application.
FIG. 2 is a schematic flowchart of a measurement reporting method according to an embodiment of this application.
FIG. 3 is a schematic flowchart of another measurement reporting method according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The following describes technical terms involved in the technical solution provided in the embodiments of this application:

1. Beam Measurement and Beam Reporting

The analog beamforming is of full-bandwidth transmission, and each polarization direction array element on a panel of each high-frequency antenna array can transmit an analog beam only in a time-division multiplexing mode. A weight of the analog beamforming is implemented by adjusting parameters of devices such as a radio frequency front-end phase shifter.

A polling method may be usually used to train analog beamforming vectors. That is, array elements of each antenna panel in each polarization direction sequentially send a training signal (that is, a candidate beamforming vector) at an appointed time in a time division multiplexing mode, and a terminal feeds back a beam report after measurement, so that a network side device can use the training signal to implement simulated beam transmission during a next service transmission. Content of a beam report usually includes identifiers of several optimal transmit beams and measured receive power of each transmit beam.

In the process of beam measurement, the network side device may configure a reference signal resource set (RS resource set), including at least one reference signal resource, such as an SSB resource or a CSI-RS resource. The UE measures the L1-RSRP/L1-SINR of each RS resource, and reports at least one optimal measurement result to the network side device. The reported content may include the SSBRI and/or CRI and L1-RSRP/L1-SINR. The report content reflects at least one optimal beam and quality thereof, which can be used by the network side device to determine a beam that is used to send channels or signals to the UE.

2. About the Beam Indication Mechanism

After beam measurement and beam reporting, the network may perform beam indication for downlink and uplink channels or reference signals, which is used to establish a beam link between the network and the UE, thus realizing transmission of channels or reference signals.

As for beam indication for a PDCCH, the network uses RRC signaling to configure K transmission configuration indication (TCI) states for each CORESET. When K>1, the MAC CE indicates or activates one TCI state, and when K=1, no additional MAC CE command is needed. When monitoring the PDCCH, the UE monitors the PDCCH by using same Quasi co-location (QCL) for all search spaces in the CORESET, that is, a same TCI state is used. The referenceSignal (for example, a period CSI-RS resource, a semi-persistent CSI-RS resource, or an SS block) and a UE-specific PDCCH DMRS port in the TCI state are spatial QCL. The UE may learn, based on the TCI state, which receiving beam to use to receive the PDCCH.

For a beam indication of a PDSCH, the network configures M TCI states by using RRC signaling, then activates 2N TCI states by using a MAC CE command, and then notifies a TCI state by using an N-bit TCI field of DCI, where referenceSignal in the TCI state and a DMRS port of the PDSCH to be scheduled are QCL. The UE may learn, based on the TCI state, which receiving beam to use to receive the PDSCH.

For a beam indication of a CSI-RS, when a CSI-RS type is a periodic CSI-RS, the network configures QCL information for a CSI-RS resource by using RRC signaling. When the CSI-RS is a semi-persistent CSI-RS, the network indicates QCL information thereof when activating, through the MAC CE command, a CSI-RS resource from a CSI-RS resource set configured by the RRC. When the CSI-RS is an aperiodic CSI-RS, the network configures the QCL for the CSI-RS resource through RRC signaling, and uses the DCI to trigger the CSI-RS.

As for beam indication for a PUCCH, the network uses RRC signaling to configure spatial relation information for each PUCCH resource through a parameter, namely, PUCCH-SpatialRelationInfo. When there are a plurality pieces of spatial relation information configured for the PUCCH resource, the MAC CE is used to activate one of the pieces of spatial relation information. When there is only one piece of spatial relation information configured for the PUCCH resource, no additional MAC CE command is required.

As for beam indication for a PUSCH, spatial relation information of the PUSCH is used when DCI carried on a PDCCH schedules a PUSCH, each SRI codepoint of an SRI field in the DCI indicates one SRI, and the SRI is used to indicate spatial relation information of the PUSCH.

As for beam indication for an SRS, when the SRS is a periodic SRS, the network configures spatial relation information for the SRS resource through RRC signaling. When the SRS is a semi-persistent SRS, the network activates, through a MAC CE command, one of a group of spatial relation information configured by the RRC. When the SRS is an aperiodic SRS, the network configures spatial relation information for the SRS resource through RRC signaling.

It should be noted that the beam information, spatial relation information, spatial domain transmission filter information, spatial filter information, TCI state information, QCL information, QCL parameters, spatial relation information, and the like have approximately the same meaning.

The downlink beam information may usually be represented by the TCI state information or the QCL information. The uplink beam information may usually be represented by the spatial relation information.

3. CSI Report Configuration

In Rel-15, there are several configuration options of "reportQuantity" in the channel state information report setting (CSI report setting), namely, "CSI-reportConfig" of radio resource control (RRC) signaling. When "reportQuantity" is set to "cri-RSRP", "ssb-Index-RSRP", or "none", and the CSI-RS is not used for the tracking reference signal (TRS), it indicates that the CSI report is used for beam measurement; when "reportQuantity" is set to "none", and the CSI-RS is used for the TRS, it indicates that measurements on these CSI-RSs are not required to be reported to the base station; others are configured to ordinary CSI information reports.

The parameter "reportConfigType" related to the time domain characteristic of the CSI report may be configured as "periodic", "semiPersistent On PUCCH", "semiPersistentOnPUSCH", and "aperiodic", which are corresponding to the periodic CSI report, the semi-persistent CSI report based on PUCCH, the semi-persistent CSI report based on PUSCH, and the aperiodic CSI report respectively.

In addition, the periodic CSI report and the semi-persistent CSI report are also configured with a reporting period and a slot offset.

One CSI report configuration is associated with one CSI resource setting, or referred to as "CSI-Resource Config", of a CSI-RS resource set or an SSB resource set used to configure beam management measurement. There is also a parameter "resourceType" related to the time domain characteristic of CSI-RS transmission in the resource configuration of the CSI-RS, and the value can be periodic, semi-persistent, or aperiodic. It should be noted that the periodic CSI report can only be associated with the periodic CSI-RS, the semi-persistent CSI report can be associated with the periodic or semi-persistent CSI-RS, and the aperiodic CSI report can be associated with the periodic, semi-persistent, or aperiodic CSI-RS. Any CSI report can be associated with the SSB.

At present, the configuration of the beam management P-3 process based on the CSI-RS is as follows: "reportQuantity" in the CSI report configuration is set to "none". The non-zero power CSI-RS resource set, namely, "NZP-CSI-RS-ResourceSet" in the associated CSI resource configuration is configured to be turned on repetition ("repetition" is set to "on"), and the TRS information CSI-RS is not used for the sounding reference signal (that is, "trs-Info" does not exist).

When groupBasedBeamReporting of the CSI report is set to "enable", it indicates that the UE may simultaneously receive multiple RSs (such as two RSs) in the CSI report by using a single spatial domain receive filter or multiple simultaneous spatial domain receive filters.

4. RRM Measurement

In the RRM measurement process, the UE may measure the reference signal of the neighboring cell, and then determine whether to perform cell handover based on this. In order to avoid short-term fluctuation of measurement results, it is usual to average a series of evenly distributed measurement samples within a measurement period, which may be referred to as the high-layer (for example, layer 3, namely, L3) measurement. The measurement result of L3 measurement is obtained by performing L3 filtering based on the layer 1 (L1) measurement result.

When the UE measures the reference signal SSB of the neighboring cell, it is necessary to set a measurement window to measure the timing of the SSB, that is, it is necessary to set a synchronization signal/physical broadcast channel block measurement timing configuration (SMTC) to avoid unnecessary measurement and reduce the energy consumption in the measurement. The period of the SMTC window may be set to be the same as that of the SSB, such as 5/10/20/40/80/160 ms, and the measurement time interval may be set to 1/2/3/4/5 ms, or the like, which is related to the number of SSBs required to be sent. The UE measures the SSB based on the SMTC configuration information, and then reports the measurement result to the gNB or selects a cell.

When the reference signal is the CSI-RS of the neighboring cell, the terminal performs L1 measurement on the CSI-RS of the neighboring cell/neighboring TRP within the CSI-RS measurement timing configuration (CMTC), and obtains a measurement result. Optionally, the CSI-RS is a CSI-RS for mobility. For still another example, when the reference signal is the SRS of the neighboring cell/neighboring TRP, the terminal performs L1 measurement on the SRS of the neighboring cell/neighboring TRP within the SRS measurement timing configuration, and obtains a measurement result. Where the SSB and the measurement time configuration are mentioned later can be extended to the CSI-RS and the CSI-RS measurement timing configuration, and the SRS and the SRS measurement timing configuration. Details are not described again. Certainly, the CSI-RS and the SRS may also determine the measurement time configuration based on the SMTC, or determine the measurement time configuration based on other reference signals. The determining the measurement time configuration based on the SMTC may refer to directly using the SMTC as the measurement time configuration or using a linear processing result of the SMTC as the measurement time configuration, such as a*SMTC+b, where a is a decimal, and b is a decimal or an integer. Optionally, a=1; and b may be negative or positive.

The terms "first", "second", and the like in this specification and claims of this application are used to distinguish between similar objects instead of describing a specific order or sequence. It should be understood that, the term used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that the technology described in the embodiments of this application is not limited to a Long Term Evolution (LTE)/LTE-advanced (LTE-A) system, and may also be used in various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The described technologies can be applied to both the systems and the radio technologies mentioned above as well as to other systems and radio technologies. However, a New Radio (NR) system is described below as an example, and the term NR is used in most of the descriptions, and these technologies can also be used in an application other than an application of the NR system, for example, a 6-th generation (6G) communications system.

FIG. 1 is a block diagram of a wireless communications system to which embodiments of this application can be applied. The wireless communications system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a bracelet, a headset, glasses, or the like. It should be noted that a type of the terminal 11 is not limited in the embodiments of this application. The network side device 12 may be a base station or a core network. The base station may be referred to as a NodeB, an evolved Node B, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, a transmitting receiving point (TRP), or another suitable term in the field provided that a same technical effect is achieved. The base station is not limited to a specific technical term. It should be noted that, in the embodiments of this application, only a base station in an NR system is used as an example, but a type of the base station is not limited.

An embodiment of this application provides a measurement reporting method, and the measurement reporting method may be applied to UE. In other words, the measurement reporting method can be executed by software or hardware installed in the UE.

With reference to the accompanying drawings, the measurement reporting method provided in the embodiments of this application is described in detail by using embodiments and application scenarios.

Usually, because the measurement result of the layer 3 measurement needs to be obtained through layer 3 filtering based on the layer 1 measurement result, the process that the UE performs and reports layer 3 measurement on the reference signal of the neighboring cell has a long delay, which is not conducive to mobility management such as cell handover.

FIG. 2 is a schematic flowchart of a measurement reporting method according to an embodiment of this application. As shown in FIG. 2, the measurement reporting method provided in this embodiment of this application may include the following step 201 and step 202.

Step 201: UE performs measurement on a target reference signal of a target neighboring cell of a first cell at a layer 1 to obtain a first measurement result.

In this embodiment of this application, the UE performs layer 1 measurement on a target reference signal of a target neighboring cell of a first cell to obtain a layer 1 measurement result.

In this embodiment of this application, the layer 1 may be a physical layer. The layer 1 may be referred to as L1.

In this embodiment of this application, the first cell may be a camped cell (namely, the current cell) of the UE, or a serving cell. This is not limited in this embodiment of this application.

In this embodiment of this application, the target neighboring cell may be a physical cell, a transmitting receiving point (TRP), or a serving cell. This is not limited in this embodiment of this application. In this embodiment of this application, the target neighboring cell may be all or part of neighboring cells of the first cell, and the target reference signal (RS) may be all or part of RSs corresponding to the target neighboring cell. This is not limited in this embodiment of this application.

In this embodiment of this application, the RS of the neighboring cell involved in this application may include at least one of: a synchronization signal and PBCH block (SSB) of the neighboring cell, a channel state information-reference signal (CSI-RS) of the neighboring cell, a sounding reference signal (SRS) of the neighboring cell, a tracking reference signal (TRS) of the neighboring cell, a phase tracking reference signal (PTRS) of the neighboring cell, a CSI-RS for mobility of the current cell of the UE, or an SRS for positioning of the current cell of the UE.

In an example, for the SSB of the neighboring cell, the network side device configures the period of the target reference signal and/or ssb-PositionsInBurst. As a result, positions and periods of all SSBs of the neighboring cell can be predicted.

In an example, the network side may configure the SSB period and/or ssb-PositionsInBurst and/or other SSB configuration information in ServingCellConfig, ServingCellConfigCommon, or ServingCellConfigCommonSIB of the current cell or the neighboring cell of the UE.

In an example, if the network side configures the SSB period and/or ssb-PositionsInBurst and/or other SSB configuration information in the current cell of the UE, it is necessary to configure the cell identifier of the neighboring cell.

In an example, the RS of the neighboring cell refers to the CSI-RS of the current cell or the CSI-RS for mobility, where the QCL RS of the CSI-RS is the SSB of the neighboring cell. Optionally, the network side configures the cell identifier of the neighboring cell in the configuration information of the CSI-RS. Optionally, the network is configured with SSB-InfoNcell which includes at least one of the cell identifier of the neighboring cell, the SSB identifier of the neighboring cell, or the SSB configuration information of the neighboring cell.

In an example, the RS of the neighboring cell is the SRS or the SRS for positioning. Optionally, the network side configures the cell identifier of the neighboring cell in the configuration information of the SRS. Optionally, the network is configured with SSB-InfoNcell which includes at least one of the cell identifier of the neighboring cell, the SSB identifier of the neighboring cell, or the SSB configuration information of the neighboring cell.

In this embodiment of this application, the first measurement result may characterize the beam quality of the target reference signal of the target neighboring cell.

Step 202: The UE reports a target measurement report to a network side device through the layer 1.

The target measurement report may include the first measurement result.

In this embodiment of this application, the UE reports a target measurement report to a network side device, where the target measurement report includes a layer 1 measurement result.

Optionally, in this embodiment of this application, in addition to the first measurement result, the target measurement report may further include the second measurement result obtained after the UE measures the reference signal of the first cell at the layer 1. In an example, the second measurement result may characterize the beam quality of the reference signal of the first cell.

Optionally, in this embodiment of this application, the UE performs, based on the first configuration information, measurement on the target reference signal of the target neighboring cell of the first cell at the layer 1 to obtain a first measurement result.

Optionally, in this embodiment of this application, the first configuration information is used for the UE to perform a target operation at a layer 1, and the target operation includes any one of: that the UE measures or reports a neighboring cell of a first cell and the first cell at the layer 1; or that the UE measures or reports the neighboring cell of the first cell at the layer 1. In an example, the first configuration information is used to instruct the UE to perform the target operation at the layer 1. In an example, the first configuration information may be configuration signaling.

In this embodiment of this application, the first configuration information is used for the UE to perform a layer 1 target operation, and the target operation includes any one of: that the UE performs layer 1 measurement on the neighboring cell of the first cell and the first cell or reports a layer 1 measurement result; or that the UE performs layer 1 measurement on the neighboring cell of the first cell or reports a layer 1 measurement result.

It can be understood that the first configuration information is used to instruct the UE to perform the layer 1 measurement/reporting. For example, the layer 1 measurement/reporting may be measurement/reporting on the RS of the neighboring cell (namely, the measurement on the RS of the current cell is not included), or the layer 1 measurement/reporting includes measurement/reporting on the RS of the neighboring cell (namely, the measurement on the RS of the current cell is included).

It should be noted that the layer 1 measurement or reporting is the measurement or reporting on the RS of the neighboring cell, that is, the layer 1 measurement or reporting does not involve the measurement or reporting on the reference signal of the current cell at the layer 1; the layer 1 measurement or reporting includes the measurement or reporting on the reference signal of the neighboring cell, that is, the layer 1 measurement or reporting may further include the measurement or reporting on the reference signal of the current cell at the layer 1.

It can be understood that the first configuration information is used to indicate that the measurement/reporting on the RS of the neighboring cell includes L1 measurement/reporting.

Optionally, in this embodiment of this application, the first configuration information may include at least one of: a cell identifier of the target neighboring cell, the target reference signal information, or first signaling. The first signaling is used to instruct the UE to perform the target operation at the layer 1, and the target reference signal information indicates the target reference signal. It should be noted that the first signaling may be special signaling configured by the network side.

For example, the cell identifier in this application may be a physical cell identifier (PCI), a CORESETPoolIndex, a TRP ID, a cell ID, any identifier that can be associated with a cell, or any identifier that can indicate a cell identifier. This is not limited in this embodiment of this application. It should be noted that the cell identifier may be cell identifier information.

In an example, when the first cell is the current cell of the UE, the first configuration information may include reference signal information of the current cell of the UE.

Optionally, in this embodiment of this application, the first configuration information may be specified by a protocol or configured by a network device for the UE. This is not limited in this embodiment of this application.

Optionally, in this embodiment of this application, before step 201, the method may further include the following step 201a.

Step 201a: The UE receives first configuration information from the network side device.

Optionally, in this embodiment of this application, the first configuration information may be associated with a layer 1 measurement configuration, or the first configuration information is associated with a high-layer measurement configuration.

It should be noted that the first configuration information may be associated with a layer 1 measurement configuration may be understood as follows: the configuration information of the layer 1 measurement configuration may include the first configuration information, that is, the first configuration information may be located in a related layer 1 measurement configuration (such as the CSI configuration, the CSI report configuration, or the like). That the first configuration information is associated with a high-layer measurement configuration can be understood as follows: the configuration information of the high-layer measurement configuration may include the first configuration information, that is, the first configuration information may be located in a related high-layer measurement configuration.

The layer 1 measurement configuration includes at least one of: a channel state information measurement configuration (CSI-MeasConfig), a channel state information report configuration (CSI-ReportConfig), a channel state information resource configuration (CSI-ResourceConfig), a non-zero power channel state information-reference signal resource set (NZP-CSI-RS-ResourceSet), a non-zero power channel state information-reference signal resource (NZP-CSI-RS-Resource), a channel state information synchronization signal block resource set (CSI-SSB-ResourceSet), a synchronization signal block to be measured (SSB to be measured), an SSB measurement timing configuration (SMTC), a sounding reference signal configuration (SRS-Config), a sounding reference signal resource set (SRS-ResourceSet), a sounding reference signal resource (SRS-Resource), a physical downlink control channel configuration (PDCCH-Config), a physical downlink shared channel configuration (PDSCH-Config), a physical uplink control channel configuration (PUCCH-Config), a physical uplink shared channel configuration (PUSCH-Config), or associated signaling.

The high-layer measurement configuration includes at least one of: a measurement configuration (MeasConfig), a measurement object (MeasObject), a new radio measurement object (MeasObjectNR), a measurement result (Meas-Results), or associated signaling.

In an example, when the first configuration information is associated with the layer 1 measurement configuration, the first configuration information is used to instruct the UE to perform L1 measurement/reporting.

In another example, when the first configuration information is associated with the high-layer measurement configuration, the first configuration information may be used to indicate that the measurement or reporting on the reference signals of the neighboring cell is the layer 1 measurement or reporting.

It can be understood that although the network side device is configured with high-layer measurement or reporting, the UE can still measure or report the beam quality of the reference signal of the neighboring cell through the layer 1.

Optionally, in this embodiment of this application, that UE performs measurement on a target reference signal of a target neighboring cell of a first cell at a layer 1 in step 201 may include the following step 201b.

Step 201b: The UE performs measurement on the target reference signal of the target neighboring cell of the first cell at the layer 1 according to a first predetermined rule.

The first predetermined rule may include any one of the following rules:

Rule 1: that in a case where the first configuration information includes the cell identifier of the target neighboring cell, the UE measures only the target reference signal of the target neighboring cell, or the UE measures the target reference signal of the target neighboring cell in priority.

Rule 2: that in a case where the first configuration information does not include a cell identifier of any neighboring cell of the first cell, the UE measures all or part of neighboring cells of the first cell.

Optionally, in this embodiment of this application, for the case that the first configuration information in Rule 1 includes the cell identifier of the target neighboring cell, any one of the following cases may further be included:

Case 1: the first configuration information includes only the cell identifier of the target neighboring cell; and Case 2: the first configuration information includes the cell identifier of the target neighboring cell and reference signal information of a current cell of the UE.

As for Case 1, the target measurement report may satisfy at least one of:

in a case that the first configuration information includes only a cell identifier of one target neighboring cell of the first cell, the target measurement report does not include the cell identifier; or in a case that the first configuration information includes cell identifiers of at least two target neighboring cells of the first cell, the target measurement report includes the cell identifier.

As for Case 2, the target measurement report satisfies any one of:

in a case that there is one target neighboring cell, the target measurement report includes the cell identifier; or in a case that there are a plurality of target neighboring cells, the target measurement report includes the cell identifier, where the current cell is the first cell.

It should be noted that the first configuration information includes only a cell identifier of one target neighboring cell of the first cell in Case 1 can be understood as follows: the first configuration information can include only the cell identifier of one target neighboring cell, or the first configuration information includes only the cell identifier of one target neighboring cell.

For example, for one report config, resource config, measure config or associated configuration information, it is specified in the protocol that only one cell identifier can be associated; or, for one report config, resource config, measure config or associated configuration information, a plurality of cell identifiers can be associated, but only one cell identifier is associated. In this case, in the layer 1 reporting of the RS of the neighboring cell, it is not necessary to carry the cell identifier.

It can be understood that as for Case 2, in a case where the first configuration information includes the cell identifier of the target neighboring cell and the reference signal information of the current cell of the UE, the UE may not consider the number of target neighboring cells, and all target measurement reports reported by the UE are required to include the cell identifier.

It should be noted that the cell identifier included in the target measurement report in this embodiment of this application may be the cell identifier of the target neighboring cell. It should be noted that a type of the cell identifier included in the target measurement report may be the same as or different from a type of the cell identifier included in the first configuration information. This is not limited in this embodiment of this application.

For example, the cell identifier of measurement configuration may be different from the cell identifier reported by the UE. The former is probably a physical cell identifier (with more bits), while the latter may be an ID indicating a neighboring cell (with less bits), such as two neighboring cells. The cell identifiers of measurement configuration may be 165 and 233, and the cell identifiers reported by the UE may be 0 and 1.

As for the case that the first configuration information does not include a cell identifier of any neighboring cell of the first cell in Rule 2:

Optionally, in this embodiment of this application, the part of neighboring cells may be: a neighboring cell satisfying a first condition among neighboring cells reported to the network side device by the UE through a high-layer report before the UE reports the target measurement report to the network side device through the layer 1.

The high-layer report is used for at least one of: a radio resource management (RRM) measurement, a radio link monitoring (RLM) measurement, an intra-frequency or out-of-frequency measurement of synchronization signal block (SSB), or an intra-frequency or out-of-frequency measurement of channel state information reference signal (CSI-RS); and the high-layer report is configured through a high-layer measurement.

The high-layer measurement configuration includes at least one of: MeasConfig, MeasObject, MeasObjectNR, MeasResults, or associated signaling.

For example, the first condition may be the best beam quality.

It should be noted that the neighboring cell satisfying the first condition may be a known neighboring cell. In an example, the known neighboring cell is configured by the network side for the UE through other high-layer signaling. For example, the high-layer measurement configuration, and the high-layer measurement configuration includes at least one of: MeasConfig, MeasObject, MeasObjectNR, MeasResults, or associated signaling.

Optionally, in this embodiment of this application, the neighboring cell satisfying the first condition includes N neighboring cells satisfying the first condition. A value of N may be configured by the network side device, or defaulted in a protocol, or reported by the UE, and N is an integer greater than or equal to 1.

In an example, the UE may report the value of N based on the capability of the UE.

Optionally, in this embodiment of this application, the first cell includes a serving cell or a current cell of the UE; the target measurement report may satisfy any one of:

that in a case where N is equal to 1, and/or the first configuration information does not include the reference signal information of the current cell, the target measurement report does not include the cell identifier; or that in a case where N is greater than 1, and/or the first configuration information further includes the reference signal information of the current cell, the target measurement report includes the cell identifier.

It can be understood that in a case where the first configuration information does not include the reference signal information of the current cell, the UE may determine whether to report the cell identifier based on the value of N, and in the case where N is equal to 1, the target measurement report does not include the cell identifier, or in the case where N is greater than 1, the target measurement report includes the cell identifier.

Optionally, in this embodiment of this application, that UE performs measurement on a target reference signal of a target neighboring cell of a first cell at a layer 1 in step 201 may include the following step 201c.

Step 201c: The UE performs measurement on the target reference signal of the target neighboring cell of the first cell at the layer 1 according to a second predetermined rule.

The second predetermined rule includes any one of the following rules:

Rule 3: that in a case where the first configuration information includes the target reference signal information, the UE measures only the target reference signal, or the UE measures the target reference signal in priority.

For example, the network side configures RSs for the UE, and the UE may measure only these RSs, or the UE may measure these RSs in priority. The network side configures an RS list for the UE.

Rule 4: that in a case where the first configuration information does not include reference signal information of any reference signal of the neighboring cell of the first cell, the UE measures all or part of reference signals of the neighboring cell of the first cell.

For example, the network side does not configure a RS for the UE, and the UE may measure all RSs or known RSs of the cell.

All the RSs or the known RSs refer to the SSB, and/or the CSI-RS associated with the RS of this cell or the CSI-RS for mobility, and/or the SRS associated with the RS of this cell or the SRS for positioning.

It should be noted that the known RS may be configured by the network side for the UE through other high-layer signaling. For example, the high-layer measurement configuration, and the high-layer measurement configuration includes at least one of: MeasConfig, MeasObject, MeasObjectNR, MeasResults, or associated signaling.

It should be noted that if the network side does not configure a RS for the UE, there may be two cases for measured neighboring cells. In one case, the network side may configure the cell identifier of the neighboring cell for the UE, and in this case, the UE may measure the configured RS of the neighboring cell. In another case, the network side does not configure the cell identifier of the neighboring cell for the UE. In this case, the UE may measure RSs of all or known neighboring cells.

As for the case that the first configuration information includes the target reference signal information in Rule 3:

Optionally, in this embodiment of this application, the first configuration information may include first reference signal information, the first reference signal information indicates X first reference signals, the target reference signal is all or part of the X first reference signals, the first reference signal information includes the target reference signal information, and X is a positive integer.

It can be understood that any first reference signal may be a reference signal of the current cell of the UE or a reference signal of the neighboring cell.

Optionally, in this embodiment of this application, the first reference signal information includes one or more pieces of reference signal information, and one cell identifier is corresponding to at least one piece of reference signal information.

It can be understood that the first reference signal information is an RS list, one cell identifier is corresponding to one RS list, and all RSs in the RS list belong to a cell corresponding to the cell identifier; or one cell identifier is corresponding to one RS, that is, each RS is required to be associated with one cell identifier regardless of whether a plurality of RSs belong to a same cell or not.

For example, the first reference signal information may include at least one of: a reference signal identifier, time domain information, frequency domain information, a resource element pattern, SSB-InfoNcell, or QCL information.

The time domain information may include at least one of: a period, an offset, a quantity of symbols, or a symbol location; the frequency domain information may include at least one of: synchronization signal block positions in burst (ssb-PositionsInBurst), a quantity of resource blocks (RB) or a quantity of subcarriers, or a resource block (RB) location or a subcarrier location; and the SSB-InfoNcell may include at least one of: the cell identifier of the neighboring cell, the SSB identifier of the neighboring cell, or the SSB configuration information of the neighboring cell.

The reference signal identifier in this application may include at least one of: SSB index, CSI-RS-Index, zero power CSI-RS resource indicator (zp-CSI-RS-ResourceId), non-zero power CSI-RS resource indicator (NZP-CSI-RS-ResourceId), or SRS index.

For example, the first configuration information may include the first reference signal information, and the target measurement report may include at least one of: the reference signal resource indicator, the target reference signal information, or the cell identifier.

As for the case that the target measurement report includes the reference signal resource indicator:

Optionally, in this embodiment of this application, the reference signal resource indicator includes at least one of: a synchronization signal block resource indicator (SSBRI), a CSI reference signal resource indicator (CRI), or an SRS resource indicator.

It should be noted that the reference signal resource indicator includes but is not limited to the three indicators described above, for example, the reference signal resource indicator may also include a TRS resource indicator.

Optionally, in this embodiment of this application, the reference signal resource indicator includes Y sub-resource indicators, and in a case where each sub-resource indicator is corresponding to one first reference signal of the X first reference signals, the target measurement report does not include the cell identifier.

For example, the first cell is the current cell of the UE, and neighboring cells of the first cell are a neighboring cell 1 and a neighboring cell 2. There are nine SSBs in the first reference signal information, where the current cell of the UE has three SSBs, corresponding SSBRIs are 0, 1, and 2, the neighboring cell 1 has three SSBs, corresponding SSBRIs are 3, 4, and 5, and the neighboring cell 2 has three SSBs, corresponding SSBRIs are 6, 7, and 8. Because the SSBRIs respectively corresponding to the current cell of the UE, the neighboring cell 1, and the neighboring cell 2 are different from each other, and each sub-resource indicator in the SSBRI is corresponding to one SSB out of nine SSBs. Therefore, after receiving the SSBRI reported by the UE, the network device may determine a corresponding SSB, thus determining the associated cell. In this case, the UE may not report the cell identifier.

It can be understood that when the SSBRI is corresponding to the sequence of all SSB resources associated with the first reference signal information, and the CRI is corresponding to the sequence of all CRI-RS resources associated with the first reference signal information, the UE does not need to report the cell identifier.

Optionally, in this embodiment of this application, the reference signal resource indicator includes Y sub-resource indicators, and in a case where any sub-resource indicator is corresponding to at least two first reference signals of the X first reference signals, the target measurement report includes the cell identifier; or in a case that the at least two first reference signals are associated with only one cell, the target measurement report does not include the cell identifier; or in a case that the at least two first reference signals are associated with at least two cells, the target measurement report includes the cell identifier.

For example, the cell described above may be the current cell of the UE or the neighboring cell of the first cell. This is not limited in this embodiment of this application.

For example, the at least two cells may be at least two neighboring cells of the first cell, or one current cell of the UE and at least one neighboring cell of the first cell. This is not limited in this embodiment of this application.

For example, there are six SSBs in the first reference signal information, if three SSBs among the six SSBs are associated with the neighboring cell 1, and SSBRIs corresponding to the three SSBs are 0, 1, and 2, other three SSBs among the six SSBs are associated with the neighboring cell 2, and SSBRIs corresponding to the other three SSBs are also 0, 1, and 2. Because the SSBRIs corresponding to the neighboring cell 1 are the same as the SSBRIs corresponding to the neighboring cell 2, that is, in the SSBRIs, the sub-resource indicator 0 is corresponding to two SSBs, the sub-resource indicator 1 is corresponding to two SSBs, and the sub-resource indicator 2 is corresponding to two SSBs. After receiving the SSBRIs reported by the UE, the network side device cannot distinguish the SSBs indicated by the SSBRIs, that is, the associated cells cannot be confirmed. In this case, the UE needs to report the cell identifier.

It should be noted that if all SSBs in the first reference signal information are associated with only one cell, the UE does not report the cell identifier. For example, there are six SSBs in the first reference signal information, and if the six SSBs are associated with only one neighboring cell, the UE does not report the cell identifier to the network side device through the layer 1.

Optionally, in this embodiment of this application, the reference signal resource indicator may be used to indicate a corresponding between the Y sub-resource indicators and the X first reference signals, where the corresponding is determined based on a quantity of reference signal lists associated with the first configuration information or a quantity of reference signal resource lists associated with the first configuration information. For example, if the first configuration information is associated with only one reference signal list or reference signal resource list, each sub-resource indicator is corresponding to one of the X first reference signals. For example, if the first configuration information is associated with a plurality of reference signal lists or reference signal resource lists, any sub-resource indicator may be corresponding to at least two of the X first reference signals.

As for the case that the target measurement report includes the target reference signal information and/or the cell identifier:

Optionally, in the case where the first configuration information includes the first reference signal information, the target measurement report satisfies any one of:

that in a case that the first reference signal information is associated with only one cell, the target measurement report includes the target reference signal information, and does not include the cell identifier; or that in a case that the first reference signal information is associated with at least two cells, the target measurement report includes the target reference signal information and the cell identifier.

For example, the cell described above may be the current cell of the UE or the neighboring cell of the first cell. This is not limited in this embodiment of this application.

For example, the at least two cells may be at least two neighboring cells of the first cell, or one current cell of the UE and at least one neighboring cell. This is not limited in this embodiment of this application.

For example, there are a plurality of SSBs in the first reference information. If the plurality of SSBs are associated with only one neighboring cell, the UE reports the SSB index to the network side device through the layer 1 without reporting the cell identifier. If a part of SSBs in the plurality of SSBs is associated with one neighboring cell, and another part of SSBs is associated with another neighboring cell or the current cell of the UE, the UE reports the SSB index and the cell identifier to the network side device through the layer 1.

Optionally, that the target measurement report includes the target reference signal information refers to that the target measurement report includes an identifier of the target reference signal, which may include at least one of: SSB index, CSI-RS-Index, zp-CSI-RS-ResourceId, NZP-CSI-RS-ResourceId, or SRS index.

As for that the first configuration information does not include reference signal information of any reference signal of the neighboring cell of the first cell in Rule 4:

Optionally, in this embodiment of this application, in a case where the first configuration information does not include reference signal information of any reference signal of the neighboring cell of the first cell, the target measurement report includes the target reference signal information and/or the cell identifier.

Optionally, that the target measurement report includes the target reference signal information refers to that the target measurement report includes an identifier of the target reference signal, which may include at least one of: SSB index, CSI-RS-Index, zp-CSI-RS-ResourceId, NZP-CSI-RS-ResourceId, or SRS index.

For example, if the network side does not configure a RS for the UE, at least one of the following is reported at the layer 1: SSB index, CSI-RS-Index, zp-CSI-RS-ResourceId, NZP-CSI-RS-ResourceId, or a cell identifier of the cell to which the RS belongs.

Optionally, in this embodiment of this application, the part of reference signals is: a reference signal satisfying a second condition among reference signals reported to the network side device by the UE through a high-layer report before the UE reports the target measurement report to the network side device through the layer 1.

The high-layer report is used for at least one of: a radio resource management (RRM) measurement, a radio link monitoring (RLM) measurement, an intra-frequency or out-of-frequency measurement of SSB, or an intra-frequency or out-of-frequency measurement of CSI-RS; and the high-layer report is configured through a high-layer measurement.

The high-layer measurement configuration includes at least one of: MeasConfig, MeasObject, MeasObjectNR, MeasResults, or associated signaling.

For example, the second condition may be the best beam quality.

Optionally, in this embodiment of this application, the reference signal satisfying the second condition includes M reference signals satisfying the second condition. A value of M may be configured by the network side device, or defaulted in a protocol, or reported by the UE, and M is an integer greater than or equal to 1.

In an example, the UE may report the value of M based on the capability of the UE.

Optionally, in this embodiment of this application, the UE may limit the measurement behavior within the SMTC or not based on the network side configuration, the capability of the UE, and the like.

Optionally, in this embodiment of this application, the method may further include the following step 203.

Step 203: The UE determines, based on first information, whether the UE measures the target reference signal of the target neighboring cell within an SSB measurement timing configuration (SMTC).

The first information includes at least one of: information for indicating whether to configure the cell identifier of the target neighboring cell, information for indicating whether to configure the target reference signal information, a quantity of configured target neighboring cells, a quantity of configured target reference signals, or information for indicating whether to configure a target reference signal period.

Example 1, when the first information includes information indicating whether to configure the cell identifier of the target neighboring cell, if the UE determines that the network side device is not configured with the cell identifier of the target neighboring cell, the UE measures the target reference signal of the target neighboring cell within the SMTC; if the UE determines that the network side device is configured with the cell identifier of the target neighboring cell, the UE does not measure the target reference signal of the target neighboring cell within the SMTC.

Example 2, when the first information includes information indicating whether to configure the target reference signal information, if the UE determines that the network side device is not configured with the target reference signal information, the UE measures the target reference signal of the target neighboring cell within the SMTC; if the UE determines that the network side device is configured with the target reference signal information, the UE does not measure the target reference signal of the target neighboring cell within the SMTC.

The target reference signal information may be a target reference signal identifier, such as SSB index, CSI-RS-Index, zp-CSI-RS-ResourceId, NZP-CSI-RS-ResourceId, and the like, and may also be target reference signal resource information, such as time domain resource information, frequency domain resource information, and the like. This is not limited in this embodiment of this application.

Example 3, when the first information includes a quantity of configured target neighboring cells, if the UE determines that the number of target neighboring cells configured by the network side device is greater than or not less than a first threshold, the UE measures the target reference signal of the target neighboring cell within the SMTC; if the UE determines that the number of target neighboring cells configured by the network side device is not greater than or less than a second threshold, the UE does not measure the target reference signal of the target neighboring cell within the SMTC.

The number of target neighboring cells may be the identifier number of the cell identifiers of the target neighboring cell.

Example 4, when the first information includes a quantity of configured target reference signals, if the UE determines that the number of target reference signals configured by the network side device is greater than or not less than a third threshold, the UE measures the target reference signal of the target neighboring cell within the SMTC; if the UE determines that the number of target reference signals configured by the network side device is not greater than or less than a fourth threshold, the UE does not measure the target reference signal of the target neighboring cell within the SMTC.

Example 5, when the first information includes information indicating whether to configure the target reference signal period, if the UE determines that the network side device is not configured with the target reference signal period, the UE measures the target reference signal of the target neighboring cell within the SMTC; if the UE determines that the network side device is configured with the target reference signal period, the UE does not measure the target reference signal of the target neighboring cell within the SMTC.

If the target reference signal is the SSB, the target reference signal period is a period of the SSB of the target neighboring cell.

It should be noted that, when there are at least two pieces of first information, the UE determines, based on any one of the at least two pieces of first information, that the UE needs to limit the measurement behavior within the SMTC, and then the UE measures the target reference signal of the target neighboring cell within the SMTC.

For example, that the UE measures the target reference signal of the target neighboring cell within the SMTC refers to that only when a target reference signal measurement resource of the target neighboring cell configured by the network side device appears within the SMTC, the UE performs measurement; when the target reference signal measurement resource of the target neighboring cell configured by the network side device appears outside the SMTC, the UE does not perform measurement.

In an example, the UE may always measure the target reference signal of the target neighboring cell within the SMTC.

In another example, the UE may measure the target reference signal of the target neighboring cell for first Z times within the SMTC, and the UE may not measure the target reference signal of the target neighboring cell within the SMTC from the (Z+1)-th time.

The first Z times of measurement are limited within the SMTC because the UE cannot locate a resource location of the target reference signal due to the lack of the second information. After the UE can measure the target reference signal of the target neighboring cell for first Z times within the SMTC, the UE may obtain the first information, so that the measurement may not be limited within the SMTC.

For example, the second information includes at least one of: the cell identifier of the target neighboring cell, the target reference signal information, the number of target neighboring cells, the number of target reference signals, or the target reference signal period.

A value of Z may be configured by the network side device, or defaulted in a protocol, or reported by the UE, and Z is an integer greater than or equal to 1.

In an example, the UE may report the value of Z based on the capability of the UE.

Optionally, in this embodiment of this application, the method may further include:

in a case where a first resource corresponding to a layer 1 measurement of a second reference signal conflicts with a second resource corresponding to a high-layer measurement of a third reference signal, performing at least one of the following steps:

in a case that the second reference signal is the same as the third reference signal, performing, by the UE, layer 1 measurement on the second reference signal on a resource on which the first resource conflicts with the second resource, and/or performing, by the UE, high-layer measurement on the third reference signal on a resource on which the first resource conflicts with the second resource;

in a case that the second reference signal is different from the third reference signal, performing, by the UE, layer 1 measurement on the second reference signal on a resource on which the first resource conflicts with the second resource, or performing, by the UE, high-layer measurement on the third reference signal on a resource on which the first resource conflicts with the second resource; or in a case that the third reference signal is not marked in the high-layer measurement, performing, by the UE, layer 1 measurement on the second reference signal on the first resource, and performing high-layer measurement on the third reference signal on a third resource, where the third resource does not conflict with the first resource.

The second reference signal is one of the target reference signals.

For example, the conflict refers to that the first resource is the same as the second resource. That the first resource is the same as the second resource refers to that the first resource and the second resource are all the same, or the first resource and the second resource are partially the same.

For example, the first resource may be a time domain resource or a frequency domain resource. This is not limited in this embodiment of this application.

For example, the second resource may be a time domain resource or a frequency domain resource. This is not limited in this embodiment of this application.

It should be noted that the first resource is the same as the second resource may include at least one of: the same time domain resource; or the same frequency domain resource.

In an example, in the time domain, that the first resource is the same as the second resource may include the following cases: an OFDM symbol of the third reference signal further includes a previous OFDM symbol of the second reference signal, and/or the OFDM symbol of the third reference signal further includes a next OFDM symbol of the second reference signal, and/or the first resource is the same as the second resource after a timing is considered. The timing may be a downlink timing or an uplink timing. For example, ODFM symbols of the second reference signal are 5, 6, and 7. If the OFDM symbol of the third reference signal includes the previous ODFM symbol 4 of the second reference signal, the UE determines that the first resource is the same as the second resource, that is, there is a conflict.

It should be noted that the second reference signal is the same as the third reference signal refers to that the second reference signal and the third reference signal are a same reference signal.

It should be noted that, in a case where a first resource corresponding to a layer 1 measurement of a second reference signal conflicts with a second resource corresponding to a high-layer measurement of a third reference signal, if the second reference signal is the same as the third reference signal, it can be considered that it has no influence on the layer 1 measurement and/or the high-layer measurement.

In an example, in a case where the first reference signal is different from the second reference signal, the UE may perform layer 1 measurement on the second reference signal in priority.

In an example, in a case where the third reference signal is not marked in the high-layer measurement, the UE may perform, on the time domain resource and/or the frequency domain resource of the second reference signal, layer 1 measurement on the second reference signal in priority.

It should be noted that performing layer 1 measurement on the second reference signal in priority refers to performing measurement on the second reference signal first, and/or dropping measurement on other reference signals.

According to the measurement reporting method provided in the embodiments of this application, firstly, user equipment (UE) may perform measurement on a target reference signal of a target neighboring cell of a first cell at a layer 1 to obtain a first measurement result. Then the UE may report a target measurement report to a network side device through the layer 1. The target measurement report includes the first measurement result. According to the foregoing solution, compared with the solution that the UE needs to firstly perform measurement on the target neighboring cell at the layer 1 to obtain a measurement result, then perform layer 3 filter on the measurement result, and finally report the measurement result that is obtained after the layer 3 filtering, the UE in this application may directly measure and report the target reference signal of the target neighboring cell at the layer 1. In this way, the delay of the UE measuring the reference signal of the target neighboring cell and reporting a measurement result to the network side device may be reduced, thereby improving the efficiency of cell handover performed by the UE, and improving the mobility management between cells.

It should be noted that, the measurement reporting method provided in the embodiments of this application may be performed by a measurement reporting apparatus or a control module that is in the measurement reporting apparatus and that is configured to perform the measurement reporting method. In the embodiments of this application, the measurement reporting apparatus provided in the embodiments of this application is described by using an example in which the measurement reporting method is performed by the measurement reporting apparatus.

FIG. 3 is a schematic flowchart of a measurement reporting method according to an embodiment of this application. As shown in FIG. 3, the measurement reporting method provided in this embodiment of this application may include the following step 301.

Step 301: A network side device sends first configuration information to UE.

The first configuration information is used for the UE to perform a target operation at a layer 1; and the target operation includes any one of: that the UE measures or reports a neighboring cell of a first cell and the first cell at the layer 1; or that the UE measures or reports the neighboring cell of the first cell at the layer 1.

In an example, the first configuration information is used to instruct the UE to perform the target operation at the layer 1.

Optionally, in this embodiment of this application, in an example, the first configuration information may be configuration signaling.

It can be understood that the first configuration information is used to instruct the UE to perform the layer 1 measurement/reporting. For example, the layer 1 measurement/reporting may be measurement/reporting on the RS of the neighboring cell (namely, the measurement on the RS of the current cell is not included), or the layer 1 measurement/reporting includes measurement/reporting on the RS of the neighboring cell (namely, the measurement on the RS of the current cell is included).

It should be noted that the layer 1 measurement or reporting is the measurement or reporting on the RS of the neighboring cell, that is, the layer 1 measurement or reporting does not involve the measurement or reporting on the reference signal of the current cell at the layer 1; the layer 1 measurement or reporting includes the measurement or reporting on the reference signal of the neighboring cell, that is, the layer 1 measurement or reporting may further include the measurement or reporting on the reference signal of the current cell at the layer 1.

It can be understood that the first configuration information is used to indicate that the measurement/reporting on the RS of the neighboring cell includes L1 measurement/reporting.

Optionally, in this embodiment of this application, the first configuration information may include at least one of: a cell identifier of the target neighboring cell, the target reference signal information, or first signaling. The first signaling is used to instruct the UE to perform the target operation at the layer 1, and the target reference signal information indicates the target reference signal. It should be noted that the first signaling may be special signaling configured by the network side.

For example, the cell identifier in this application may be a PCI, a CORESETPoolIndex, a TRP ID, a cell ID, any identifier that can be associated with a cell, or any identifier that can indicate a cell identifier. This is not limited in this embodiment of this application. It should be noted that the cell identifier may be cell identifier information.

In an example, when the first cell is the current cell of the UE, the first configuration information may include reference signal information of the current cell of the UE.

Optionally, in this embodiment of this application, the first configuration information is associated with a layer 1 measurement configuration, or the first configuration information is associated with a high-layer measurement configuration.

It should be noted that the first configuration information may be associated with a layer 1 measurement configuration may be understood as follows: the configuration information of the layer 1 measurement configuration may include the first configuration information, that is, the first configuration information may be located in a related layer 1 measurement configuration (such as the CSI configuration, the CSI report configuration, or the like). That the first configuration information is associated with a high-layer measurement configuration can be understood as follows: the configuration information of the high-layer measurement configuration may include the first configuration information, that is, the first configuration information may be located in a related high-layer measurement configuration.

The layer 1 measurement configuration may include at least one of: CSI-MeasConfig, CSI-ReportConfig, CSI-ResourceConfig, NZP-CSI-RS-ResourceSet, NZP-CSI-RS-Resource, CSI-SSB-ResourceSet, SSB to be measured, SMTC, SRS-Config, SRS-ResourceSet, SRS-Resource, PDCCH-Config, PDSCH-Config, PUCCH-Config, PUSCH-Config, or associated signaling; and the high-layer measurement configuration may include at least one of: MeasConfig, MeasObject, MeasObjectNR, MeasResults, or associated signaling.

In an example, when the first configuration information is associated with the layer 1 measurement configuration, the first configuration information is used to instruct the UE to perform L1 measurement/reporting.

In another example, when the first configuration information is associated with the high-layer measurement configuration, the first configuration information may be used to indicate that the measurement or reporting on the reference signals of the neighboring cell is the layer 1 measurement or reporting.

It can be understood that although the network side device is configured with high-layer measurement or reporting, the UE can still measure or report the beam quality of the reference signal of the neighboring cell through the layer 1.

Optionally, in this embodiment of this application, the first configuration information includes first reference signal information, the first reference signal information indicates X first reference signals, the target reference signal is all or part of the X first reference signals, the first reference signal information includes the target reference signal information, and X is a positive integer.

It can be understood that any first reference signal may be a reference signal of the current cell of the UE or a reference signal of the neighboring cell.

For example, the first reference signal information may include one or more pieces of reference signal information, and one cell identifier is corresponding to at least one piece of reference signal information.

It can be understood that the first reference signal information is an RS list, one cell identifier is corresponding to one RS list, and all RSs in the RS list belong to a cell corresponding to the cell identifier; or one cell identifier is corresponding to one RS, that is, each RS is required to be associated with one cell identifier regardless of whether a plurality of RSs belong to a same cell or not.

For example, the first reference signal information includes at least one of: a reference signal identifier, time domain information, frequency domain information, or a resource element pattern.

The time domain information includes at least one of: a period, an offset, a quantity of symbols, or a symbol location; and the frequency domain information includes at least one of: synchronization signal block positions in burst (ssb-PositionsInBurst), a quantity of resource blocks (RB) or a quantity of subcarriers, or a resource block (RB) location or a subcarrier location.

The first reference signal identifier may include at least one of: SSB index, CSI-RS-Index, zp-CSI-RS-ResourceId, or NZP-CSI-RS-ResourceId.

Optionally, in this embodiment of this application, before step 301, the method may further include the following step 301a.

Step 301a: The network side device modifies first configuration information.

For example, when there are too many neighboring cells, and/or there are too many configured reference signals, and/or there are too many configured reference signal resources, the network side device may modify the first configuration information.

Example 1, if the first configuration information includes the cell identifier of the target neighboring cell, the network side device may add target reference signal information to increase the number of the first configuration information, and the modified first configuration information includes the cell identifier of the target neighboring cell and the target reference signal information.

Example 2, if the first configuration information includes the cell identifier of the target neighboring cell and the target reference signal information, the network side device may delete the target reference signal information to reduce the number of the first configuration information, and the modified first configuration information includes only the cell identifier of the target neighboring cell.

In an example, the network side device modifies at least one of the first configuration information: the cell identifier, the reference signal identifier, and the reference signal resource configuration.

For example, the reference signal resource configuration may include at least one of: a reference signal identifier, time domain information, frequency domain information, a resource element pattern, SSB-InfoNcell, or QCL information.

The time domain information may include at least one of: a period, an offset, a quantity of symbols, or a symbol location; the frequency domain information may include at least one of: synchronization signal block positions in burst (ssb-PositionsInBurst), a quantity of resource blocks (RB) or a quantity of subcarriers, or a resource block (RB) location or a subcarrier location; and the SSB-InfoNcell may include at least one of: the cell identifier of the neighboring cell, the SSB identifier of the neighboring cell, or the SSB configuration information of the neighboring cell.

Example 3, if the first configuration information includes the cell identifier of the target neighboring cell, and there are three cell identifiers of the target neighboring cell, the network side device may delete one cell identifier, and the modified first configuration information includes two cell identifiers.

Example 4, if the first configuration information includes the cell identifier of the target neighboring cell, and there are three cell identifiers of the target neighboring cell, the network side device may add one cell identifier, and the modified first configuration information includes four cell identifiers.

For example, step 301a described above may include the following step: the network side device modifies the first configuration information by using a MAC CE.

According to the measurement reporting method provided in this embodiment of this application, the network side device sends first configuration information to user equipment (UE). The first configuration information is used for the UE to perform a target operation at a layer 1; and the target operation includes any one of: that the UE measures or reports a neighboring cell of a first cell and the first cell at the layer 1; or that the UE measures or reports the neighboring cell of the first cell at the layer 1. According to the foregoing solution, compared with the solution that the UE needs to firstly perform measurement on the target neighboring cell at the layer 1 to obtain a measurement result, then perform layer 3 filter on the measurement result, and finally report the measurement result that is obtained after the layer 3 filtering, the network side device in this application may send the first configuration information to the UE, and because the first configuration information is used for the UE to perform the target operation at the layer 1, the UE may directly measure and report the target reference signal of the target neighboring cell at the layer 1. In this way, the delay of the UE measuring the reference signal of the target neighboring cell and reporting a measurement result to the network side device may be reduced, thereby improving the efficiency of cell handover performed by the UE, and improving the mobility management between cells.

It should be noted that, the measurement reporting method provided in the embodiments of this application may be performed by a measurement reporting apparatus or a control module that is in the measurement reporting apparatus and that is configured to perform the measurement reporting method. In the embodiments of this application, the measurement reporting apparatus provided in the embodiments of this application is described by using an example in which the measurement reporting method is performed by the measurement reporting apparatus.

Figure 4:
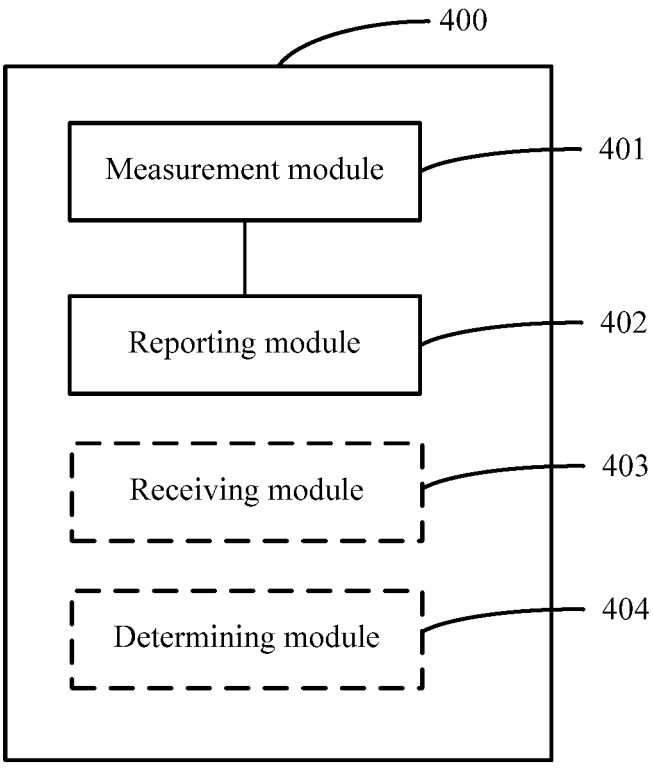
FIG. 4 is a schematic structural diagram of a measurement reporting apparatus according to an embodiment of this application.

FIG. 4 is a schematic structural diagram of a measurement reporting apparatus according to an embodiment of this application. The measurement reporting apparatus 400 may include a measurement module 401 and a reporting module 402, where the measurement module 401 is configured to perform measurement on a target reference signal of a target neighboring cell of a first cell at a layer 1 to obtain a first measurement result; and the reporting module 402 is configured to report a target measurement report to a network side device through the layer 1, where the target measurement report includes the first measurement result.

Optionally, the measurement module is configured to perform layer 1 measurement on a target reference signal of a target neighboring cell of a first cell to obtain a layer 1 measurement result; and the reporting module 402 is configured to report a target measurement report to a network side device, where the target measurement report includes the layer 1 measurement result.

Optionally, as shown in FIG. 4, the measurement reporting apparatus 400 may further include a receiving module 403; the receiving module 403 is configured to receive first configuration information from a network side device, where the first configuration information is used to perform a target operation at a layer 1; and the target operation includes any one of: that the UE measures or reports a neighboring cell of a first cell and the first cell at the layer 1; or that the UE measures or reports the neighboring cell of the first cell at the layer 1.

Optionally, the first configuration information is used for the UE to perform a layer 1 target operation, and the target operation includes any one of: that the UE performs layer 1 measurement on the neighboring cell of the first cell and the first cell or reports a layer 1 measurement result; or that the UE performs layer 1 measurement on the neighboring cell of the first cell or reports a layer 1 measurement result.

Optionally, the first configuration information includes at least one of: a cell identifier of the target neighboring cell, the target reference signal information, or first signaling, where the first signaling is used to instruct the UE to perform the target operation at the layer 1, and the target reference signal information indicates the target reference signal.

Optionally, the first configuration information is associated with a layer 1 measurement configuration, or the first configuration information is associated with a high-layer measurement configuration.

Optionally, the layer 1 measurement configuration includes at least one of: a channel state information measurement configuration (CSI-MeasConfig), a channel state information report configuration (CSI-ReportConfig), a channel state information resource configuration (CSI-ResourceConfig), a non-zero power channel state information-reference signal resource set (NZP-CSI-RS-ResourceSet), a non-zero power channel state information-reference signal resource (NZP-CSI-RS-Resource), a channel state information synchronization signal block resource set (CSI-SSB-ResourceSet), a synchronization signal block to be measured (SSB to be measured), an SSB measurement timing configuration (SMTC), a sounding reference signal configuration (SRS-Config), a sounding reference signal resource set (SRS-ResourceSet), a sounding reference signal resource (SRS-Resource), a physical downlink control channel configuration (PDCCH-Config), a physical downlink shared channel configuration (PDSCH-Config), a physical uplink control channel configuration (PUCCH-Config), a physical uplink shared channel configuration (PUSCH-Config), or associated signaling; and the high-layer measurement configuration includes at least one of: a measurement configuration (MeasConfig), a measurement object (MeasObject), a new radio measurement object (MeasObjectNR), a measurement result (MeasResults), or associated signaling.

Optionally, in a case where the first configuration information includes only the cell identifier of the target neighboring cell, the target measurement report satisfies any one of: that in a case that the first configuration information includes only a cell identifier of one target neighboring cell of the first cell, the target measurement report does not include the cell identifier; or that in a case that the first configuration information includes cell identifiers of at least two target neighboring cells of the first cell, the target measurement report includes the cell identifier; and/or in a case where the first configuration information includes the cell identifier of the target neighboring cell and reference signal information of a current cell of the UE, the target measurement report satisfies any one of: that in a case that there is one target neighboring cell, the target measurement report includes the cell identifier; or that in a case that there are a plurality of target neighboring cells, the target measurement report includes the cell identifier, where the current cell is the first cell.

Optionally, the measurement module 401 is configured to perform measurement on the target reference signal of the target neighboring cell of the first cell at the layer 1 according to a first predetermined rule, where the first predetermined rule includes any one of: that in a case where the first configuration information includes the cell identifier of the target neighboring cell, the UE measures only the target reference signal of the target neighboring cell, or the UE measures the target reference signal of the target neighboring cell in priority; or that in a case where the first configuration information does not include a cell identifier of any neighboring cell of the first cell, the UE measures all or part of neighboring cells of the first cell.

Optionally, the part of neighboring cells is: a neighboring cell satisfying a first condition among neighboring cells reported to the network side device by the UE through a high-layer report before the UE reports the target measurement report to the network side device through the layer 1, where the high-layer report is used for at least one of: a radio resource management (RRM) measurement, a radio link monitoring (RLM) measurement, an intra-frequency or out-of-frequency measurement of synchronization signal block (SSB), or an intra-frequency or out-of-frequency measurement of channel state information reference signal (CSI-RS); the high-layer report is configured through a high-layer measurement; and the high-layer measurement configuration includes at least one of: MeasConfig, MeasObject, MeasObjectNR, MeasResults, or associated signaling.

Optionally, the neighboring cell satisfying the first condition includes N neighboring cells satisfying the first condition; a value of N is configured by the network side device, or defaulted in a protocol, or reported by the UE, and N is an integer greater than or equal to 1.

Optionally, the first cell includes a serving cell or a current cell of the UE; the target measurement report satisfies any one of: that in a case where N is equal to 1, and/or the first configuration information does not include the reference signal information of the current cell, the target measurement report does not include the cell identifier; or that in a case where N is greater than 1, and/or the first configuration information further includes the reference signal information of the current cell, the target measurement report includes the cell identifier.

Optionally, the first configuration information includes first reference signal information, the target measurement report includes a reference signal resource indicator, the first reference signal information is used to indicate X first reference signals, the target reference signal is all or part of the X first reference signals, and X is a positive integer.

Optionally, the reference signal resource indicator includes at least one of: a synchronization signal block resource indicator (SSBRI) or a CSI reference signal resource indicator (CRI).

Optionally, the reference signal resource indicator includes Y sub-resource indicators, and in a case where each sub-resource indicator is corresponding to one first reference signal of the X first reference signals, the target measurement report does not include the cell identifier.

Optionally, the reference signal resource indicator includes Y sub-resource indicators, and in a case where any sub-resource indicator is corresponding to at least two first reference signals of the X first reference signals, the target measurement report includes the cell identifier; or in a case that the at least two first reference signals are associated with only one cell, the target measurement report does not include the cell identifier; or in a case that the at least two first reference signals are associated with at least two cells, the target measurement report includes the cell identifier.

Optionally, the reference signal resource indicator is used to indicate a corresponding between the Y sub-resource indicators and the X first reference signals, where the corresponding is determined based on a quantity of reference signal lists associated with the first configuration information or a quantity of reference signal resource lists associated with the first configuration information.

Optionally, the measurement module 401 is configured to perform measurement on the target reference signal of the target neighboring cell of the first cell at the layer 1 according to a second predetermined rule, where the second predetermined rule includes any one of: that in a case where the first configuration information includes the target reference signal information, the UE measures only the target reference signal, or the UE measures the target reference signal in priority; or that in a case where the first configuration information does not include reference signal information of any reference signal of the neighboring cell of the first cell, the UE measures all or part of reference signals of the neighboring cell of the first cell.

Optionally, the part of reference signals is: a reference signal satisfying a second condition among reference signals reported to the network side device by the UE through a high-layer report before the UE reports the target measurement report to the network side device through the layer 1, where the high-layer report is used for at least one of: a radio resource management (RRM) measurement, a radio link monitoring (RLM) measurement, an intra-frequency or out-of-frequency measurement of SSB, or an intra-frequency or out-of-frequency measurement of CSI-RS; the high-layer report is configured through a high-layer measurement; and the high-layer measurement configuration includes at least one of: MeasConfig, MeasObject, MeasObjectNR, MeasResults, or associated signaling.

Optionally, the reference signal satisfying the second condition includes M reference signals satisfying the second condition; a value of M is configured by the network side device, or defaulted in a protocol, or reported by the UE, and M is an integer greater than or equal to 1.

Optionally, in a case where the first configuration information includes the first reference signal information, the target measurement report includes the target reference signal information and/or the cell identifier.

Optionally, in the case where the first configuration information includes the first reference signal information, the target measurement report satisfies any one of: that in a case that the first reference signal information is associated with only one cell, the target measurement report includes the target reference signal information, and does not include the cell identifier; or that in a case that the first reference signal information is associated with at least two cells, the target measurement report includes the target reference signal information and the cell identifier.

Optionally, in a case where the first configuration information does not include reference signal information of any reference signal of the neighboring cell of the first cell, the target measurement report includes the target reference signal information and/or the cell identifier.

Optionally, the first reference signal information includes one or more pieces of reference signal information, and one cell identifier is corresponding to at least one piece of reference signal information.

Optionally, the first reference signal information includes at least one of: a first reference signal identifier, time domain information, frequency domain information, or a resource element pattern, where the time domain information includes at least one of: a period, an offset, a quantity of symbols, or a symbol location; and the frequency domain information includes at least one of: synchronization signal block positions in burst (ssb-PositionsInBurst), a quantity of resource blocks (RB) or a quantity of subcarriers, or a resource block (RB) location or a subcarrier location.

Optionally, as shown in FIG. 4, the measurement reporting apparatus 400 further includes a determining module 404; the determining module 404 is configured to determine, based on first information, whether the UE measures the target reference signal of the target neighboring cell within an SSB measurement timing configuration (SMTC), where the first information includes at least one of: information for indicating whether to configure the cell identifier of the target neighboring cell, information for indicating whether to configure the target reference signal information, a quantity of configured target neighboring cells, a quantity of configured target reference signals, or information for indicating whether to configure a target reference signal period.

Optionally, the measurement module 401 is further configured to: in a case where a first resource corresponding to a layer 1 measurement of a second reference signal conflicts with a second resource corresponding to a high-layer measurement of a third reference signal, perform at least one of the following steps: in a case that the second reference signal is the same as the third reference signal, performing, by the UE, layer 1 measurement on the second reference signal on a resource on which the first resource conflicts with the second resource, and/or performing, by the UE, high-layer measurement on the third reference signal on a resource on which the first resource conflicts with the second resource; in a case that the second reference signal is different from the third reference signal, performing, by the UE, layer 1 measurement on the second reference signal on a resource on which the first resource conflicts with the second resource, or performing, by the UE, high-layer measurement on the third reference signal on a resource on which the first resource conflicts with the second resource; or in a case that the third reference signal is not marked in the high-layer measurement, performing, by the UE, layer 1 measurement on the second reference signal on the first resource, and performing high-layer measurement on the third reference signal on a third resource, where the third resource does not conflict with the first resource, and the second reference signal is one of the target reference signals.

According to the measurement reporting apparatus provided in the embodiments of this application, firstly, user equipment (UE) may perform measurement on a target reference signal of a target neighboring cell of a first cell at a layer 1 to obtain a first measurement result. Then the UE may report a target measurement report to a network side device through the layer 1. The target measurement report includes the first measurement result. According to the foregoing solution, compared with the solution that the UE needs to firstly perform measurement on the target neighboring cell at the layer 1 to obtain a measurement result, then perform layer 3 filter on the measurement result, and finally report the measurement result that is obtained after the layer 3 filtering, the UE in this application may directly measure and report the target reference signal of the target neighboring cell at the layer 1. In this way, the delay of the UE measuring the reference signal of the target neighboring cell and reporting a measurement result to the network side device may be reduced, thereby improving the efficiency of cell handover performed by the UE, and improving the mobility management between cells.

The measurement reporting apparatus in the embodiments of this application may be an apparatus, or may be a component, an integrated circuit, or a chip in the terminal. The apparatus may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not limited in the embodiments of this application.

The measurement reporting apparatus in the embodiments of this application may be an apparatus with an operating system. The operating system may be an Android operating system, an iOS operating system, or another possible operating system. This is not limited in the embodiments of this application.

The measurement reporting apparatus provided in the embodiments of this application can implement the processes implemented in the method embodiment, and a same technical effect can be achieved. To avoid repetition, details are not described herein again.

Figure 5:
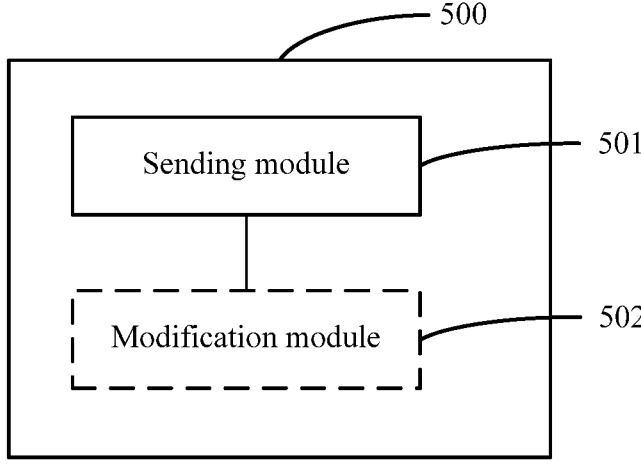
FIG. 5 is a schematic structural diagram of another measurement reporting apparatus according to an embodiment of this application.

FIG. 5 is a schematic structural diagram of a measurement reporting apparatus according to an embodiment of this application. The measurement reporting apparatus 500 may include a sending module 501, where the sending module 501 is configured to send first configuration information to user equipment (UE), where the first configuration information is used for the UE to perform a target operation at a layer 1; and the target operation includes any one of: that the UE measures or reports a neighboring cell of a first cell and the first cell at the layer 1; or that the UE measures or reports the neighboring cell of the first cell at the layer 1.

Optionally, the first configuration information includes at least one of: a cell identifier of the target neighboring cell, the target reference signal information, or first signaling, where the first signaling is used to instruct the UE to perform the target operation at the layer 1, and the target reference signal information indicates the target reference signal.

Optionally, the first configuration information is associated with a layer 1 measurement configuration, or the first configuration information is associated with a high-layer measurement configuration.

Optionally, the layer 1 measurement configuration includes at least one of: CSI-MeasConfig, CSI-ReportConfig, CSI-ResourceConfig, NZP-CSI-RS-ResourceSet, NZP-CSI-RS-Resource, CSI-SSB-ResourceSet, SSB to be measured, SMTC, SRS-Config, SRS-ResourceSet, SRS-Resource, PDCCH-Config, PDSCH-Config, PUCCH-Config, PUSCH-Config, or associated signaling; and the high-layer measurement configuration includes at least one of: MeasConfig, MeasObject, MeasObjectNR, MeasResults, or associated signaling.

Optionally, the first configuration information includes first reference signal information, the first reference signal information indicates X first reference signals, the target reference signal is all or part of the X first reference signals, the first reference signal information includes the target reference signal information, and X is a positive integer.

Optionally, the first reference signal information includes one or more pieces of reference signal information, and one cell identifier is corresponding to at least one piece of reference signal information.

Optionally, the first reference signal information includes at least one of: a first reference signal identifier, time domain information, frequency domain information, or a resource element pattern, where the time domain information includes at least one of: a period, an offset, a quantity of symbols, or a symbol location; and the frequency domain information includes at least one of: synchronization signal block positions in burst (ssb-PositionsInBurst), a quantity of resource blocks (RB) or a quantity of subcarriers, or a resource block (RB) location or a subcarrier location.

Optionally, as shown in FIG. 5, the measurement reporting apparatus 500 may further include a modifying module 502, and the modifying module 502 is configured to modify the first configuration information.

Optionally, the modifying module 502 is configured to modify the first configuration information by using a MAC CE.

According to the measurement reporting apparatus provided in this embodiment of this application, the network side device sends first configuration information to user equipment (UE). The first configuration information is used for the UE to perform a target operation at a layer 1; and the target operation includes any one of: that the UE measures or reports a neighboring cell of a first cell and the first cell at the layer 1; or that the UE measures or reports the neighboring cell of the first cell at the layer 1. According to the foregoing solution, compared with the solution that the UE needs to firstly perform measurement on the target neighboring cell at the layer 1 to obtain a measurement result, then perform layer 3 filter on the measurement result, and finally report the measurement result that is obtained after the layer 3 filtering, the network side device in this application may send the first configuration information to the UE, and because the first configuration information is used for the UE to perform the target operation at the layer 1, the UE may directly measure and report the target reference signal of the target neighboring cell at the layer 1. In this way, the delay of the UE measuring the reference signal of the target neighboring cell and reporting a measurement result to the network side device may be reduced, thereby improving the efficiency of cell handover performed by the UE, and improving the mobility management between cells.

The measurement reporting apparatus in the embodiments of this application may be an apparatus, or may be a component, an integrated circuit, or a chip in the terminal. The apparatus may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not limited in the embodiments of this application.

The measurement reporting apparatus in the embodiments of this application may be an apparatus with an operating system. The operating system may be an Android operating system, an iOS operating system, or another possible operating system. This is not limited in the embodiments of this application.

The measurement reporting apparatus provided in the embodiments of this application can implement the processes implemented in the method embodiment, and a same technical effect can be achieved. To avoid repetition, details are not described herein again.

Figure 6:
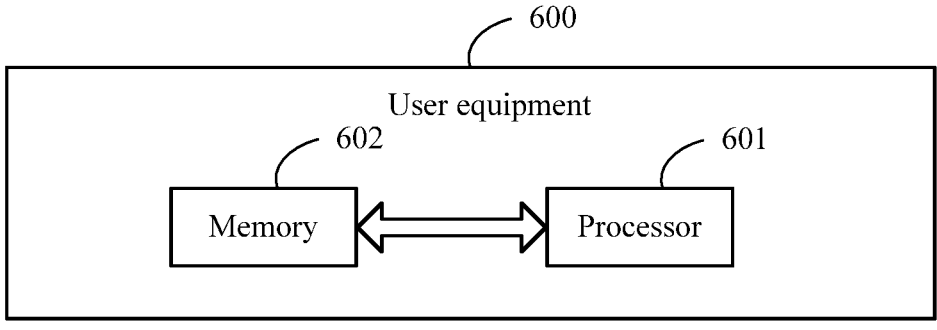
FIG. 6 is a first schematic structural diagram of user equipment according to an embodiment of this application.

Optionally, as shown in FIG. 6, an embodiment of this application further provides user equipment 600, including a processor 601, a memory 602, and a program or an instruction stored in the memory 602 and executable on the processor 601. When the program or the instruction are executed by the processor 601, the processes of the foregoing measurement reporting method embodiments are implemented, and a same technical effect can be achieved. To avoid repetition, details are not described herein again.

Figure 7:
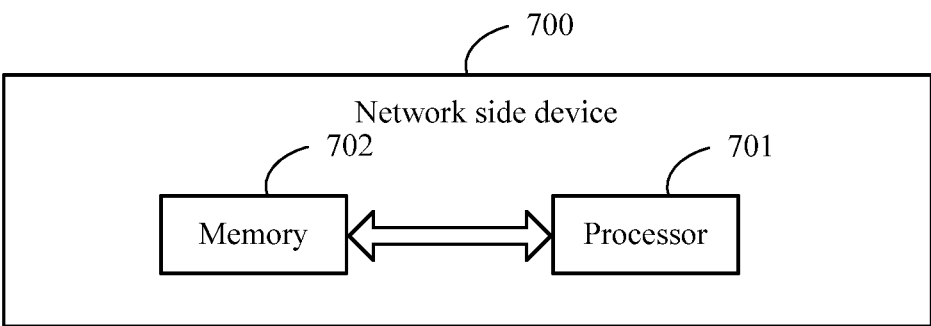
FIG. 7 is a first structural schematic diagram of a network side device according to an embodiment of this application.

Optionally, as shown in FIG. 7, an embodiment of this application further provides a network side device 700, including a processor 701, a memory 702, and a program or an instruction stored in the memory 702 and executable on the processor 701. When the program or the instruction is executed by the processor 701, the processes of the foregoing measurement reporting method embodiments are implemented, and a same technical effect can be achieved. To avoid repetition, details are not described herein again.

Figure 8:
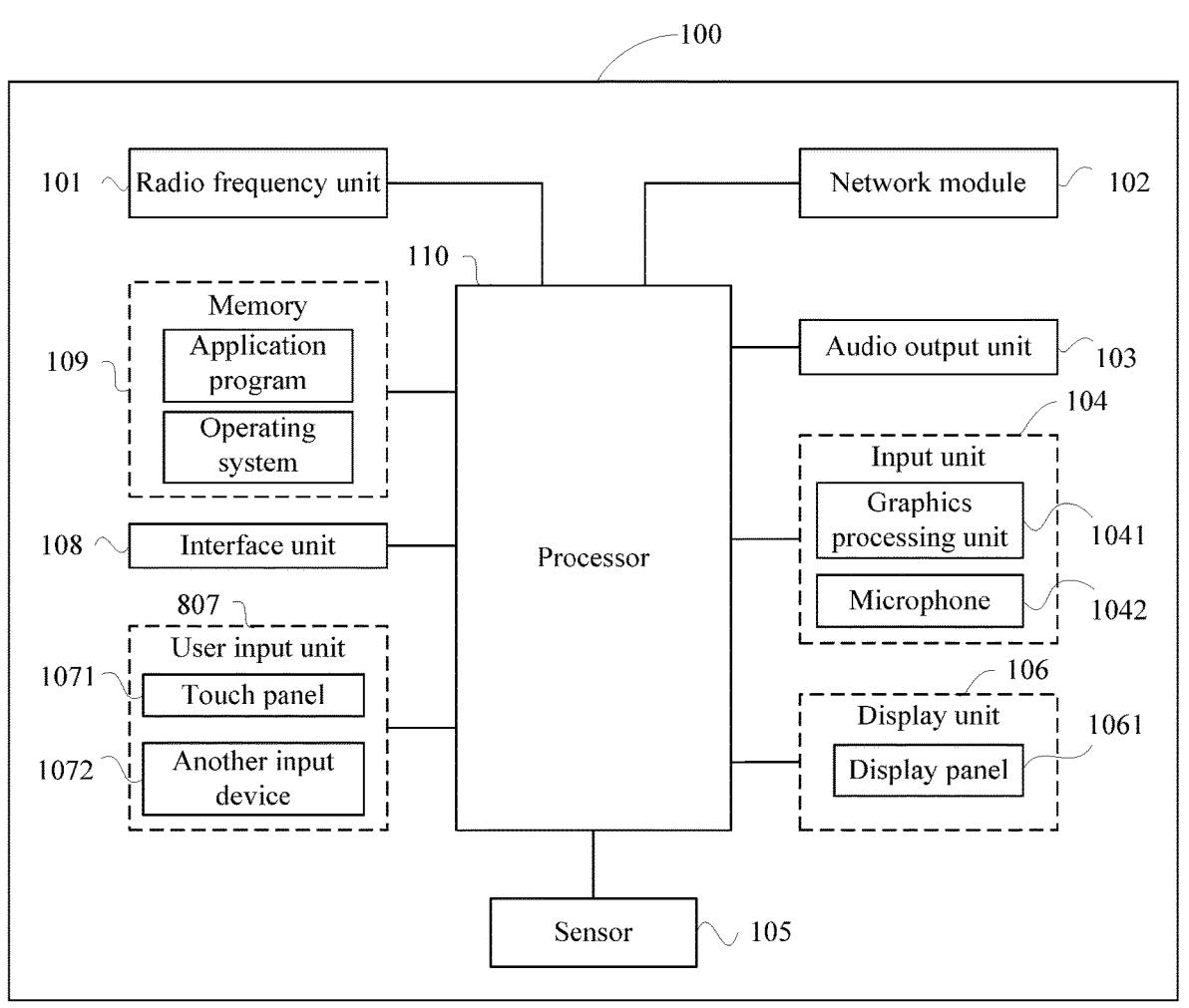
FIG. 8 is a second schematic structural diagram of user equipment according to an embodiment of this application.

FIG. 8 is a schematic diagram of a hardware structure of user equipment according to an embodiment of this application.

The user equipment 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the user equipment 100 may further include a power supply (for example, a battery) that supplies power to the components. The power supply may be logically connected to the processor 110 by using a power management system, so as to implement functions such as charging management, discharging management, and power consumption management by using the power management system. The user equipment is not limited to the user equipment structure shown in FIG. 8. The user equipment may include more or fewer components than those shown in the figure, or combine some components, or have a different component arrangement. Details are not described herein.

It should be understood that, in this embodiment of this application, the input unit 104 may include a graphics processing unit (GPU) 1041 and a microphone 1042, and the graphics processing unit 1041 processes image data of a still picture or a video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein.

In this embodiment of this application, the radio frequency unit 101 receives downlink data from a network side device and then sends the downlink data to the processor 110 for processing; and sends uplink data to the network side device. Usually, the radio frequency unit 101 includes but is not limited to an antenna, at least one amplifier, a transceiver, a coupler, a low noise amplifier, a duplexer, and the like.

The memory 109 may be configured to store a software program or an instruction and various data. The memory 109 may mainly include a program or instruction storage area and a data storage area. The program or instruction storage area may store an operating system, and an application program or an instruction required by at least one function (for example, a sound playing function or an image playing function). In addition, the memory 109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 110 may include one or more processing units. Optionally, an application processor and a modem processor may be integrated into the processor 110. The application processor mainly processes an operating system, a user interface, an application program, an instruction, or the like. The modem processor mainly processes wireless communications, for example, a baseband processor. It can be understood that, alternatively, the modem processor may not be integrated into the processor 110.

The processor 110 is configured to perform measurement on a target reference signal of a target neighboring cell of a first cell at a layer 1 to obtain a first measurement result; and the radio frequency unit 101 is configured to report a target measurement report to a network side device through the layer 1, where the target measurement report includes the first measurement result.

Optionally, the processor 110 is configured to perform layer 1 measurement on a target reference signal of a target neighboring cell of a first cell to obtain a layer 1 measurement result; and the reporting module 402 is configured to report a target measurement report to a network side device, where the target measurement report includes the layer 1 measurement result.

Optionally, the radio frequency unit 101 is further configured to receive first configuration information from a network side device, where the first configuration information is used for the UE to perform a target operation at a layer 1; and the target operation includes any one of: that the UE measures or reports a neighboring cell of a first cell and the first cell at the layer 1; or that the UE measures or reports the neighboring cell of the first cell at the layer 1.

Optionally, the first configuration information is used for the UE to perform a layer 1 target operation, and the target operation includes any one of: that the UE performs layer 1 measurement on the neighboring cell of the first cell and the first cell or reports a layer 1 measurement result; or that the UE performs layer 1 measurement on the neighboring cell of the first cell or reports a layer 1 measurement result.

Optionally, the first configuration information includes at least one of: a cell identifier of the target neighboring cell, the target reference signal information, or first signaling, where the first signaling is used to instruct the UE to perform the target operation at the layer 1, and the target reference signal information indicates the target reference signal.

Optionally, the first configuration information is associated with a layer 1 measurement configuration, or the first configuration information is associated with a high-layer measurement configuration.

Optionally, the layer 1 measurement configuration includes at least one of: a channel state information measurement configuration (CSI-MeasConfig), a channel state information report configuration (CSI-ReportConfig), a channel state information resource configuration (CSI-ResourceConfig), a non-zero power channel state information-reference signal resource set (NZP-CSI-RS-ResourceSet), a non-zero power channel state information-reference signal resource (NZP-CSI-RS-Resource), a channel state information synchronization signal block resource set (CSI-SSB-ResourceSet), a synchronization signal block to be measured (SSB to be measured), an SSB measurement timing configuration (SMTC), a sounding reference signal configuration (SRS-Config), a sounding reference signal resource set (SRS-ResourceSet), a sounding reference signal resource (SRS-Resource), a physical downlink control channel configuration (PDCCH-Config), a physical downlink shared channel configuration (PDSCH-Config), a physical uplink control channel configuration (PUCCH-Config), a physical uplink shared channel configuration (PUSCH-Config), or associated signaling; and the high-layer measurement configuration includes at least one of: a measurement configuration (MeasConfig), a measurement object (MeasObject), a new radio measurement object (MeasObjectNR), a measurement result (MeasResults), or associated signaling.

Optionally, in a case where the first configuration information includes only the cell identifier of the target neighboring cell, the target measurement report satisfies any one of: that in a case that the first configuration information includes only a cell identifier of one target neighboring cell of the first cell, the target measurement report does not include the cell identifier; or that in a case that the first configuration information includes cell identifiers of at least two target neighboring cells of the first cell, the target measurement report includes the cell identifier; and/or in a case where the first configuration information includes the cell identifier of the target neighboring cell and reference signal information of a current cell of the UE, the target measurement report satisfies any one of: that in a case that there is one target neighboring cell, the target measurement report includes the cell identifier; or that in a case that there are a plurality of target neighboring cells, the target measurement report includes the cell identifier, where the current cell is the first cell.

Optionally, the processor 110 is configured to perform measurement on the target reference signal of the target neighboring cell of the first cell at the layer 1 according to a first predetermined rule, where the first predetermined rule includes any one of: that in a case where the first configuration information includes the cell identifier of the target neighboring cell, the UE measures only the target reference signal of the target neighboring cell, or the UE measures the target reference signal of the target neighboring cell in priority; or that in a case where the first configuration information does not include a cell identifier of any neighboring cell of the first cell, the UE measures all or part of neighboring cells of the first cell.

Optionally, the part of neighboring cells is: a neighboring cell satisfying a first condition among neighboring cells reported to the network side device by the UE through a high-layer report before the UE reports the target measurement report to the network side device through the layer 1, where the high-layer report is used for at least one of: a radio resource management (RRM) measurement, a radio link monitoring (RLM) measurement, an intra-frequency or out-of-frequency measurement of synchronization signal block (SSB), or an intra-frequency or out-of-frequency measurement of channel state information reference signal (CSI-RS); the high-layer report is configured through a high-layer measurement; and the high-layer measurement configuration includes at least one of: MeasConfig, MeasObject, MeasObjectNR, MeasResults, or associated signaling.

Optionally, the neighboring cell satisfying the first condition includes N neighboring cells satisfying the first condition; a value of N is configured by the network side device, or defaulted in a protocol, or reported by the UE, and N is an integer greater than or equal to 1.

Optionally, the first cell includes a serving cell or a current cell of the UE; the target measurement report satisfies any one of: that in a case where N is equal to 1, and/or the first configuration information does not include the reference signal information of the current cell, the target measurement report does not include the cell identifier; or that in a case where N is greater than 1, and/or the first configuration information further includes the reference signal information of the current cell, the target measurement report includes the cell identifier.

Optionally, the first configuration information includes first reference signal information, the target measurement report includes a reference signal resource indicator, the first reference signal information is used to indicate X first reference signals, the target reference signal is all or part of the X first reference signals, and X is a positive integer.

Optionally, the reference signal resource indicator includes at least one of: a synchronization signal block resource indicator (SSBRI) or a CSI reference signal resource indicator (CRI).

Optionally, the reference signal resource indicator includes Y sub-resource indicators, and in a case where each sub-resource indicator is corresponding to one first reference signal of the X first reference signals, the target measurement report does not include the cell identifier.

Optionally, the reference signal resource indicator includes Y sub-resource indicators, and in a case where any sub-resource indicator is corresponding to at least two first reference signals of the X first reference signals, the target measurement report includes the cell identifier; or in a case that the at least two first reference signals are associated with only one cell, the target measurement report does not include the cell identifier; or in a case that the at least two first reference signals are associated with at least two cells, the target measurement report includes the cell identifier.

Optionally, the reference signal resource indicator is used to indicate a corresponding between the Y sub-resource indicators and the X first reference signals, where the corresponding is determined based on a quantity of reference signal lists associated with the first configuration information or a quantity of reference signal resource lists associated with the first configuration information.

Optionally, the processor 110 is configured to perform measurement on the target reference signal of the target neighboring cell of the first cell at the layer 1 according to a second predetermined rule, where the second predetermined rule includes any one of: that in a case where the first configuration information includes the target reference signal information, the UE measures only the target reference signal, or the UE measures the target reference signal in priority; or that in a case where the first configuration information does not include reference signal information of any reference signal of the neighboring cell of the first cell, the UE measures all or part of reference signals of the neighboring cell of the first cell.

Optionally, the part of reference signals is: a reference signal satisfying a second condition among reference signals reported to the network side device by the UE through a high-layer report before reporting the target measurement report to the network side device through the layer 1, where the high-layer report is used for at least one of: a radio resource management (RRM) measurement, a radio link monitoring (RLM) measurement, an intra-frequency or out-of-frequency measurement of SSB, or an intra-frequency or out-of-frequency measurement of CSI-RS; the high-layer report is configured through a high-layer measurement; and the high-layer measurement configuration includes at least one of: MeasConfig, MeasObject, MeasObjectNR, MeasResults, or associated signaling.

Optionally, the reference signal satisfying the second condition includes M reference signals satisfying the second condition; a value of M is configured by the network side device, or defaulted in a protocol, or reported by the UE, and M is an integer greater than or equal to 1.

Optionally, in a case where the first configuration information includes the first reference signal information, the target measurement report includes the target reference signal information and/or the cell identifier.

Optionally, in the case where the first configuration information includes the first reference signal information, the target measurement report satisfies any one of: that in a case that the first reference signal information is associated with only one cell, the target measurement report includes the target reference signal information, and does not include the cell identifier; or that in a case that the first reference signal information is associated with at least two cells, the target measurement report includes the target reference signal information and the cell identifier.

Optionally, in a case where the first configuration information does not include reference signal information of any reference signal of the neighboring cell of the first cell, the target measurement report includes the target reference signal information and/or the cell identifier.

Optionally, the first reference signal information includes one or more pieces of reference signal information, and one cell identifier is corresponding to at least one piece of reference signal information.

Optionally, the first reference signal information includes at least one of: a first reference signal identifier, time domain information, frequency domain information, or a resource element pattern, where the time domain information includes at least one of: a period, an offset, a quantity of symbols, or a symbol location; and the frequency domain information includes at least one of: synchronization signal block positions in burst (ssb-PositionsInBurst), a quantity of resource blocks (RB) or a quantity of subcarriers, or a resource block (RB) location or a subcarrier location.

Optionally, the processor 110 is configured to determine, based on first information, whether the UE measures the target reference signal of the target neighboring cell within an SSB measurement timing configuration (SMTC), where the first information includes at least one of: information for indicating whether to configure the cell identifier of the target neighboring cell, information for indicating whether to configure the target reference signal information, a quantity of configured target neighboring cells, a quantity of configured target reference signals, or information for indicating whether to configure a target reference signal period.

Optionally, the processor 110 is further configured to: in a case where a first resource corresponding to a layer 1 measurement of a second reference signal conflicts with a second resource corresponding to a high-layer measurement of a third reference signal, perform at least one of the following steps: in a case that the second reference signal is the same as the third reference signal, performing, by the UE, layer 1 measurement on the second reference signal on a resource on which the first resource conflicts with the second resource, and/or performing, by the UE, high-layer measurement on the third reference signal on a resource on which the first resource conflicts with the second resource; in a case that the second reference signal is different from the third reference signal, performing, by the UE, layer 1 measurement on the second reference signal on a resource on which the first resource conflicts with the second resource, or performing, by the UE, high-layer measurement on the third reference signal on a resource on which the first resource conflicts with the second resource; or in a case that the third reference signal is not marked in the high-layer measurement, performing, by the UE, layer 1 measurement on the second reference signal on the first resource, and performing high-layer measurement on the third reference signal on a third resource, where the third resource does not conflict with the first resource, and the second reference signal is one of the target reference signals.

According to the user equipment provided in the embodiments of this application, firstly, the user equipment (UE) may perform measurement on a target reference signal of a target neighboring cell of a first cell at a layer 1 to obtain a first measurement result. Then the UE may report a target measurement report to a network side device through the layer 1. The target measurement report includes the first measurement result. According to the foregoing solution, compared with the solution that the UE needs to firstly perform measurement on the target neighboring cell at the layer 1 to obtain a measurement result, then perform layer 3 filter on the measurement result, and finally report the measurement result that is obtained after the layer 3 filtering, the UE in this application may directly measure and report the target reference signal of the target neighboring cell at the layer 1. In this way, the delay of the UE measuring the reference signal of the target neighboring cell and reporting a measurement result to the network side device may be reduced, thereby improving the efficiency of cell handover performed by the UE, and improving the mobility management between cells.

Figure 9:
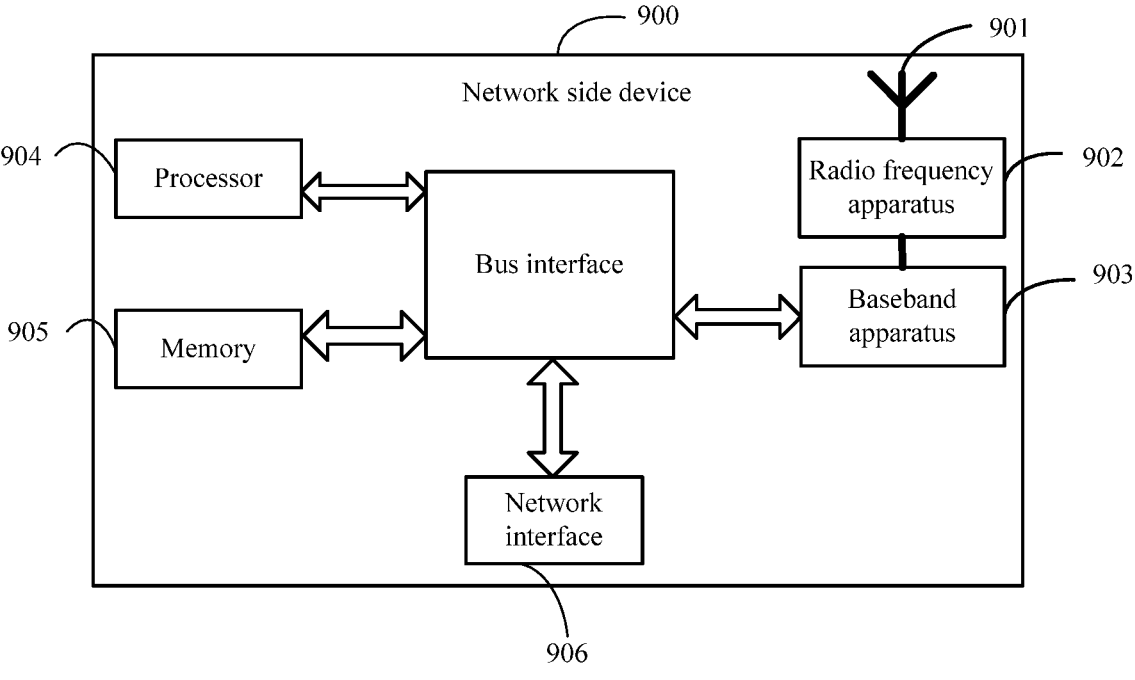
FIG. 9 is a second schematic structural diagram of a network side device according to an embodiment of this application.

For example, an embodiment of this application further provides a network side device. As shown in FIG. 9, the network side device 900 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and transmits the received information to the baseband apparatus 903 for processing. In a downlink direction, the baseband apparatus 903 processes information that needs to be sent, and sends processed information to the radio frequency apparatus 902. The radio frequency apparatus 902 processes the received information, and sends processed information by using the antenna 901.

The frequency band processing apparatus may be located in the baseband apparatus 903. The method performed by the network side device in the foregoing embodiment may be implemented in the baseband apparatus 903. The baseband apparatus 903 includes a processor 904 and a memory 905.

For example, the baseband apparatus 903 may include at least one baseband board. Multiple chips are disposed on the baseband board. As shown in FIG. 9, one chip is, for example, the processor 904, and is connected to the memory 905, to invoke a program in the memory 905 to perform an operation of the network side device shown in the foregoing method embodiment.

The baseband apparatus 903 may further include a network interface 906, configured to exchange information with the radio frequency apparatus 902, where the interface is, for example, a common public radio interface (CPRI).

For example, the network side device in this embodiment of this application further includes an instruction or a program stored in the memory 905 and executable on the processor 904. The processor 904 invokes the instruction or the program in the memory 905 to perform the method performed by the modules shown in FIG. 5, and a same technical effect is achieved. To avoid repetition, details are not described herein again.

An embodiment of this application further provides a non-transitory computer-readable storage medium, where the non-transitory computer-readable storage medium stores a program or an instruction, and when the program or the instruction is executed by a processor, the processes of the foregoing measurement reporting method embodiment are implemented, and a same technical effect can be achieved. To avoid repetition, details are not described herein again.

The processor is a processor in the terminal in the above embodiment. The non-transitory computer-readable storage medium includes a read-only memory (ROM), a random access memory (RAM), a magnetic disk, an optical disc, or the like.

An embodiment of this application further provides a chip. The chip includes a processor and a communications interface, the communications interface is coupled to the processor, and the processor is configured to execute a program or an instruction of a network side device to implement the processes of the foregoing measurement reporting method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing implementation manners. The foregoing implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. A measurement reporting method, wherein the method comprises:

performing, by a user equipment (UE), measurement on a target reference signal of a target neighboring cell of a first cell at a layer 1 to obtain a first measurement result; and reporting, by the UE, a target measurement report to a network side device directly only through the layer 1, wherein the target measurement report comprises the first measurement result; wherein before the performing, by a UE, measurement on a target reference signal of a target neighboring cell of a first cell at a layer 1 to obtain a first measurement result, the method further comprises:

receiving, by the UE, first configuration information from the network side device, wherein the first configuration information is used for the UE to perform a target operation at the layer 1;

the target operation comprises any one of: that the UE measures or reports the target neighboring cell of the first cell and the first cell at the layer 1; or that the UE measures or reports the target neighboring cell of the first cell at the layer 1; and the first configuration information is associated with a layer 1 measurement configuration, wherein the layer 1 measurement configuration comprises a channel state information resource configuration (CSI-ResourceConfig).

2. The method according to claim 1, wherein the first configuration information comprises at least one of: a cell identifier of the target neighboring cell, target reference signal information, or a first signaling; wherein the first signaling is used to instruct the UE to perform the target operation at the layer 1, and the target reference signal information indicates the target reference signal.

3. The method according to claim 1, wherein the layer 1 measurement configuration further comprises at least one of: a channel state information measurement configuration (CSI-MeasConfig), a channel state information report configuration (CSI-ReportConfig), a non-zero power channel state information-reference signal resource set (NZP-CSI-RS-ResourceSet), a non-zero power channel state information-reference signal resource (NZP-CSI-RS-Resource), a channel state information synchronization signal block resource set (CSI-SSB-ResourceSet), a synchronization signal block (SSB) to be measured, an SSB measurement timing configuration (SMTC), a sounding reference signal configuration (SRS-Config), a sounding reference signal resource set (SRS-ResourceSet), a sounding reference signal resource (SRS-Resource), a physical downlink control channel configuration (PDCCH-Config), a physical downlink shared channel configuration (PDSCH-Config), a physical uplink control channel configuration (PUCCH-Config), a physical uplink shared channel configuration (PUSCH-Config), or an associated signaling.

4. The method according to claim 2, wherein in a case where the first configuration information comprises only the cell identifier of the target neighboring cell, the target measurement report satisfies any one of:

that in a case that the first configuration information comprises only a cell identifier of one target neighboring cell of the first cell, the target measurement report does not comprise the cell identifier; or that in a case that the first configuration information comprises cell identifiers of at least two target neighboring cells of the first cell, the target measurement report comprises the cell identifier;

and/or in a case where the first configuration information comprises the cell identifier of the target neighboring cell and reference signal information of a current cell of the UE, the target measurement report satisfies any one of:

that in a case that there is one target neighboring cell, the target measurement report comprises the cell identifier; or that in a case that there are a plurality of target neighboring cells, the target measurement report comprises the cell identifier; wherein the current cell is the first cell.

5. The method according to claim 2, wherein the performing, by a UE, measurement on a target reference signal of a target neighboring cell of a first cell at a layer 1 comprises:

performing, by the UE, measurement on the target reference signal of the target neighboring cell of the first cell at the layer 1 according to a first predetermined rule; wherein the first predetermined rule comprises any one of:

that in a case where the first configuration information comprises the cell identifier of the target neighboring cell, the UE measures only the target reference signal of the target neighboring cell, or the UE measures the target reference signal of the target neighboring cell in priority; or that in a case where the first configuration information does not comprise a cell identifier of any neighboring cell of the first cell, the UE measures all or part of neighboring cells of the first cell.

6. The method according to claim 5, wherein the part of neighboring cells is: a neighboring cell satisfying a first condition among neighboring cells reported to the network side device by the UE through a high-layer report before the UE reports the target measurement report to the network side device through the layer 1; wherein the high-layer report is used for at least one of: a radio resource management (RRM) measurement, a radio link monitoring (RLM) measurement, an intra-frequency or out-of-frequency measurement of synchronization signal block (SSB), or an intra-frequency or out-of-frequency measurement of channel state information reference signal (CSI-RS); the high-layer report is configured through a high-layer measurement; and the high-layer measurement configuration comprises at least one of: a measurement configuration (MeasConfig), a measurement object (MeasObject), a new radio measurement object (MeasObjectNR), a measurement result (MeasResults), or an associated signaling.

7. The method according to claim 6, wherein the neighboring cell satisfying the first condition comprises N neighboring cells satisfying the first condition; a value of N is configured by the network side device, or defaulted in a protocol, or reported by the UE, and N is an integer greater than or equal to 1; wherein the first cell comprises a serving cell or a current cell of the UE; the target measurement report satisfies any one of:

that in a case where N is equal to 1, and/or the first configuration information does not comprise reference signal information of the current cell, the target measurement report does not comprise the cell identifier; or that in a case where N is greater than 1, and/or the first configuration information further comprises reference signal information of the current cell, the target measurement report comprises the cell identifier.

8. The method according to claim 2, wherein the first configuration information comprises first reference signal information, the target measurement report comprises a reference signal resource indicator, the first reference signal information is used to indicate X first reference signals, the target reference signal is all or part of the X first reference signals, and X is a positive integer.

9. The method according to claim 8, wherein the reference signal resource indicator comprises Y sub-resource indicators, and in a case where each sub-resource indicator is corresponding to one first reference signal of the X first reference signals, the target measurement report does not comprise the cell identifier;

or the reference signal resource indicator comprises Y sub-resource indicators, and in a case where any sub-resource indicator is corresponding to at least two first reference signals of the X first reference signals, the target measurement report comprises the cell identifier; or in a case that the at least two first reference signals are associated with only one cell, the target measurement report does not comprise the cell identifier; or in a case that the at least two first reference signals are associated with at least two cells, the target measurement report comprises the cell identifier.

10. The method according to claim 2, wherein the performing, by a UE, measurement on a target reference signal of a target neighboring cell of a first cell at a layer 1 comprises:

performing, by the UE, measurement on the target reference signal of the target neighboring cell of the first cell at the layer 1 according to a second predetermined rule; wherein the second predetermined rule comprises any one of:

that in a case where the first configuration information comprises the target reference signal information, the UE measures only the target reference signal, or the UE measures the target reference signal in priority; or that in a case where the first configuration information does not comprise reference signal information of any reference signal of the neighboring cell of the first cell, the UE measures all or part of reference signals of the neighboring cell of the first cell.

11. The method according to claim 10, wherein the part of reference signals is: a reference signal satisfying a second condition among reference signals reported to the network side device by the UE through a high-layer report before the UE reports the target measurement report to the network side device through the layer 1; wherein the high-layer report is used for at least one of: a radio resource management (RRM) measurement, a radio link monitoring (RLM) measurement, an intra-frequency or out-of-frequency measurement of synchronization signal block (SSB), or an intra-frequency or out-of-frequency measurement of channel state information reference signal (CSI-RS); the high-layer report is configured through a high-layer measurement; and the high-layer measurement configuration comprises at least one of: a measurement configuration (MeasConfig), a measurement object (MeasObject), a new radio measurement object (MeasObjectNR), a measurement result (MeasResults), or an associated signaling.

12. The method according to claim 8, wherein in a case where the first configuration information comprises the first reference signal information, the target measurement report comprises the target reference signal information and/or the cell identifier; wherein the target measurement report satisfies any one of:

that in a case that the first reference signal information is associated with only one cell, the target measurement report comprises the target reference signal information, and does not comprise the cell identifier; or that in a case that the first reference signal information is associated with at least two cells, the target measurement report comprises the target reference signal information and the cell identifier.

13. The method according to claim 2, wherein in a case where the first configuration information does not comprise reference signal information of any reference signal of the neighboring cell of the first cell, the target measurement report comprises the target reference signal information and/or the cell identifier.

14. The method according to claim 8, wherein the first reference signal information comprises one or more pieces of reference signal information, and one cell identifier is corresponding to at least one piece of reference signal information;

and/or the first reference signal information comprises at least one of: a first reference signal identifier, time domain information, frequency domain information, or a resource element pattern; wherein the time domain information comprises at least one of: a period, an offset, a quantity of symbols, or a symbol location; and the frequency domain information comprises at least one of: synchronization signal block positions in burst (ssb-PositionsInBurst), a quantity of resource blocks (RB) or a quantity of subcarriers, or a RB location or a subcarrier location.

15. The method according to claim 1, wherein the method further comprises:

determining, by the UE based on first information, whether the UE measures the target reference signal of the target neighboring cell within a synchronization signal block measurement timing configuration (SMTC); wherein the first information comprises at least one of: information for indicating whether to configure the cell identifier of the target neighboring cell, information for indicating whether to configure the target reference signal information, a quantity of configured target neighboring cells, a quantity of configured target reference signals, or information for indicating whether to configure a target reference signal period.

16. The method according to claim 1, wherein the method further comprises:

in a case where a first resource corresponding to a layer 1 measurement of a second reference signal conflicts with a second resource corresponding to a high-layer measurement of a third reference signal, performing at least one of following steps:

in a case that the second reference signal is same as the third reference signal, performing, by the UE, layer 1 measurement on the second reference signal on a resource on which the first resource conflicts with the second resource, and/or performing, by the UE, high-layer measurement on the third reference signal on a resource on which the first resource conflicts with the second resource;

in a case that the second reference signal is different from the third reference signal, performing, by the UE, layer 1 measurement on the second reference signal on a resource on which the first resource conflicts with the second resource, or performing, by the UE, high-layer measurement on the third reference signal on a resource on which the first resource conflicts with the second resource; or in a case that the third reference signal is not marked in the high-layer measurement, performing, by the UE, layer 1 measurement on the second reference signal on the first resource, and performing high-layer measurement on the third reference signal on a third resource, wherein the third resource does not conflict with the first resource; wherein the second reference signal is one of the target reference signals.

17. A user equipment (UE), comprising a processor, a memory, and a program or an instruction stored in the memory and executable on the processor, wherein the program or the instruction, when executed by the processor, causes the UE to perform:

performing measurement on a target reference signal of a target neighboring cell of a first cell at a layer 1 to obtain a first measurement result; and reporting a target measurement report to a network side device directly only through the layer 1, wherein the target measurement report comprises the first measurement result; and the program or the instruction, when executed by the processor, causes the UE to further perform:

receiving first configuration information from the network side device, wherein the first configuration information is used for the UE to perform a target operation at the layer 1;

the target operation comprises any one of: that the UE measures or reports the target neighboring cell of the first cell and the first cell at the layer 1; or that the UE measures or reports the target neighboring cell of the first cell at the layer 1; and the first configuration information is associated with a layer 1 measurement configuration, wherein the layer 1 measurement configuration comprises a channel state information resource configuration (CSI-ResourceConfig).

18. The UE according to claim 17, wherein the first configuration information comprises at least one of: a cell identifier of the target neighboring cell, target reference signal information, or a first signaling; wherein the first signaling is used to instruct the UE to perform the target operation at the layer 1, and the target reference signal information indicates the target reference signal.

* * * * *